(12) United States Patent
Wada

(10) Patent No.: US 10,574,172 B2
(45) Date of Patent: Feb. 25, 2020

(54) POWER CONVERSION DEVICE, MOTOR DRIVE UNIT, AND ELECTRIC POWER STEERING DEVICE

(71) Applicant: NIDEC CORPORATION, Kyoto-shi, Kyoto (JP)

(72) Inventor: Eiji Wada, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/082,153

(22) PCT Filed: Mar. 1, 2017

(86) PCT No.: PCT/JP2017/008189
§ 371 (c)(1),
(2) Date: Sep. 4, 2018

(87) PCT Pub. No.: WO2017/150638
PCT Pub. Date: Sep. 8, 2017

(65) Prior Publication Data
US 2019/0089287 A1 Mar. 21, 2019

(30) Foreign Application Priority Data
Mar. 4, 2016 (JP) ................................ 2016-042742

(51) Int. Cl.
*H02P 29/028* (2016.01)
*H02P 25/22* (2006.01)
(Continued)

(52) U.S. Cl.
CPC .............. *H02P 29/028* (2013.01); *B62D 5/04* (2013.01); *B62D 5/0484* (2013.01); *H02M 1/32* (2013.01);
(Continued)

(58) Field of Classification Search
CPC ........... H02M 2007/4835; H02M 1/32; H02M 2001/325; H02M 7/483; H02M 7/49
See application file for complete search history.

(56) References Cited

U.S. PATENT DOCUMENTS 8,983,730 B2 * 3/2015 Suzuki ................. B62D 5/0403
318/432
2006/0108957 A1 5/2006 Urakabe et al.
(Continued)

FOREIGN PATENT DOCUMENTS

JP 2006149153 A 6/2006
JP 2011025872 A 2/2011
(Continued)

OTHER PUBLICATIONS

International Search Report corresponding to Application No. PCT/JP2017/008189; dated May 16, 2017.

*Primary Examiner* — Shawki S Ismail
*Assistant Examiner* — Zoheb S Imtiaz
(74) *Attorney, Agent, or Firm* — Cantor Colburn LLP

(57) ABSTRACT

A power conversion device may include a first inverter to which a first end of each phase winding is coupled; a second inverter to which a second end of each phase winding is coupled; a plurality of switching elements provided in the first and second inverters; a control circuit structured to perform n-phase conduction control on the first and second inverters; and a detection circuit structured to detect a failure in the switching elements. The control circuit is structured such that, when the detection circuit has detected a failure in any of the plurality of switching elements, the control circuit changes the control of the first and second inverters from the n-phase conduction control to m-phase conduction control using m phases of the n phases different from the phase of
(Continued)

a winding coupled to the failed switching element, m being an integer not smaller than two and smaller than n.

10 Claims, 19 Drawing Sheets

(51) Int. Cl.
    *B62D 5/04*     (2006.01)
    *H02M 1/32*     (2007.01)
    *H02M 7/5387*     (2007.01)
    *H02P 6/08*     (2016.01)
    *H02P 29/032*     (2016.01)

(52) U.S. Cl.
    CPC ........ *H02M 7/53871* (2013.01); *H02P 6/085* (2013.01); *H02P 25/22* (2013.01); *H02P 29/032* (2016.02)

(56) References Cited

U.S. PATENT DOCUMENTS

| | | | | |
|---|---|---|---|---|
| 2008/0067960 A1* | 3/2008 | Maeda | ................... | B62D 5/046 318/400.02 |
| 2008/0211439 A1* | 9/2008 | Yokota | ................. | G01R 31/343 318/400.21 |
| 2010/0060222 A1* | 3/2010 | Kezobo | ................. | G01R 31/42 318/490 |
| 2010/0083692 A1 | 4/2010 | Todd et al. | | |
| 2011/0025244 A1 | 2/2011 | Ura | | |
| 2011/0074323 A1* | 3/2011 | Mukai | ................. | B62D 5/0463 318/400.21 |
| 2011/0074333 A1* | 3/2011 | Suzuki | ................. | B62D 5/0403 318/724 |
| 2013/0179040 A1* | 7/2013 | Suzuki | ................. | B62D 5/0403 701/43 |
| 2013/0271056 A1* | 10/2013 | Bunte | ................... | F03D 7/0224 318/503 |
| 2014/0077745 A1* | 3/2014 | Kinouchi | ................ | H02M 1/32 318/514 |
| 2014/0225535 A1* | 8/2014 | Omata | ................... | B60L 11/14 318/34 |
| 2015/0107934 A1* | 4/2015 | Morino | ................ | B62D 5/0487 180/407 |
| 2015/0280609 A1* | 10/2015 | Murata | ................ | H02M 7/537 363/97 |
| 2016/0134212 A1 | 5/2016 | Kikuchi et al. | | |
| 2016/0355210 A1* | 12/2016 | Inada | ................... | B62D 5/0406 |
| 2017/0117830 A1* | 4/2017 | Kanekawa | ............. | H02P 21/50 |
| 2017/0349207 A1* | 12/2017 | Maeshima | ................ | H02P 27/06 |
| 2018/0079449 A1* | 3/2018 | Furukawa | ................ | B62D 5/046 |
| 2018/0354549 A1* | 12/2018 | Tsubaki | ................ | B62D 5/0487 |
| 2019/0074790 A1* | 3/2019 | Aoyagi | ................... | H02P 27/06 |

FOREIGN PATENT DOCUMENTS

| | | |
|---|---|---|
| JP | 2011078221 A | 4/2011 |
| JP | 2013118777 A | 6/2013 |
| JP | 5569626 B1 | 8/2014 |
| JP | 2014192950 A | 10/2014 |
| JP | 2015033269 A | 2/2015 |
| JP | 2016019385 A | 2/2016 |
| JP | 2016181948 A | 10/2016 |

* cited by examiner

POWER CONVERSION DEVICE, MOTOR DRIVE UNIT, AND ELECTRIC POWER STEERING DEVICE

CROSS REFERENCE TO RELATED APPLICATIONS

This is the U.S. national stage of application No. PCT/JP2017/008189, filed on Mar. 1, 2017. Priority under 35 U.S.C. § 119(a) and 35 U.S.C. § 365(b) is claimed from Japanese Application No. 2016-042742, filed Mar. 4, 2016; the disclosures of which are incorporated herein by reference.

TECHNICAL FIELD

The present disclosure relates to power conversion devices for converting power that is to be supplied to an electric motor, motor drive units, and electric power steering devices.

BACKGROUND

Electric motors (hereinafter simply referred to as "motors") such as brushless DC motors and AC synchronous motors are typically driven by three phase currents. A complicated control technique, such as vector control, is needed to accurately control the waveforms of the three phase currents. Such a control technique requires complicated mathematical calculation and is therefore performed using a digital computation circuit, such as a microcontroller (microcomputer). The vector control technique is utilized in the fields of applications in which the load on a motor varies significantly, such as washing machines, motorized bicycles, electric scooters, electric power steering devices, electric cars, and industrial equipment. Meanwhile, other motor control techniques, such as pulse width modulation (PWM), are employed for motors that have a relatively low output.

In the field of vehicle-mounted devices, an automotive electronic control unit (ECU) is used in a vehicle. The ECU includes a microcontroller, a power supply, an input/output circuit, an A/D converter, a load drive circuit, and a read only memory (ROM), etc. An electronic control system is constructed using the ECU as a main component. For example, the ECU processes a signal from a sensor to control an actuator, such as a motor. More specifically, the ECU controls an inverter in a power conversion device while monitoring the rotational speed or torque of a motor. The power conversion device converts drive power that is to be supplied to the motor, under the control of the ECU.

A mechanically and electronically integrated motor in which a motor, a power conversion device, and an ECU are integrated together has in recent years been developed. In particular, in the field of vehicle-mounted devices, high quality needs to be ensured for safety. Therefore, a fault-tolerant design is employed in order to allow the motor system to continue a safe operation even if some part of the motor system fails. As an example of such a fault-tolerant design, a single motor may be provided with two power conversion devices. As another example, the ECU may be provided with a backup microcontroller in addition to a main microcontroller.

For example, Patent Document No. 1 describes a power conversion device for converting power that is to be supplied to a three-phase motor, the device including a control unit and two inverters. The two inverters are each coupled to a power supply and a ground (hereinafter referred to as a "GND"). One of the two inverters is coupled to one end of each of the three phase windings of the motor, and the other inverter is coupled to the other end of each of the three phase windings. Each inverter includes a bridge circuit that includes three legs each including a high-side switching element and a low-side switching element. The control unit, when detecting a failure in a switching element in the two inverters, switches the control of the motor from control under normal conditions to control under abnormal conditions. As used herein, the term "abnormal conditions" mainly means that a switching element has failed. The term "control under normal conditions" means control that is performed when all the switching elements are operating normally. The term "control under abnormal conditions" means control that is performed in the event of a failure in a switching element.

In the control under abnormal conditions, a neutral point for the windings is formed by turning on and off switching elements according to a predetermined rule in one of the two inverters that includes a switching element that has failed (hereinafter referred to as a "failed inverter"). According to the rule, for example, in the event of an open-circuit failure in which a high-side switching element is always off, the three high-side switching elements other than the failed switching element are turned off, and the three low-side switching elements are turned on, in the bridge circuit of the failed inverter. In this case, the neutral point is formed on the low side. In the event of a short-circuit failure in which a high-side switching element is always on, the three high-side switching elements other than the failed switching element are turned on, and the three low-side switching elements are turned off, in the bridge circuit of the failed inverter. In this case, the neutral point is formed on the high side. In the power conversion device of Patent Document No. 1, the neutral point for the three phase windings is formed in a failed inverter under abnormal conditions. Even in the event of a failure in a switching element, the motor can continue to be driven using one of the inverters that is operating normally.

CITATION LIST

Patent Literature

Patent Document No. 1: Japanese Laid-Open Patent Publication No. 2014-192950

SUMMARY

In the above conventional technique, there has been demand for further improvement in current control under normal and abnormal conditions.

An embodiment of the present disclosure provides a power conversion device that can perform suitable current control under both normal and abnormal conditions.

An example power conversion device according to the present disclosure for converting power that is to be supplied to an electric motor having n phase windings (n is an integer of three or more), includes a first inverter to which one end of each phase winding of the electric motor is coupled, a second inverter to which the other end of each phase winding is coupled, a control circuit that performs n-phase conduction control on the first and second inverters, and a detection circuit that detects a failure in a plurality of switching elements included in the first and second inverters. When the detection circuit has detected a failure in any of the plurality of switching elements, the control circuit changes the control of the first and second inverters from the n-phase conduction control to m-phase conduction control using m phases of the n phases different from the phase of a winding coupled to the failed switching element (m is an integer of not smaller than two and smaller than n).

According to the embodiment of the present disclosure, when a failure has been detected in any of the switching elements, the control of the first and second inverters is changed from the n-phase conduction control to m-phase conduction control (m is an integer of not smaller than two and smaller than n). As a result, suitable current control can be performed under both normal and abnormal conditions.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Before describing embodiments of the present disclosure, the present inventor's findings that are the basis of the present disclosure will be described.

In the power conversion device of Patent Document No. 1, the two inverters are each always connected to the power supply and the GND. This configuration does not allow the power supply and the failed inverter to be disconnected from each other. The present inventor has found the problem that even when a neutral point is formed in a failed inverter under abnormal conditions, a current flows from the power supply into the failed inverter. As a result, a power loss occurs in the failed inverter.

As with the power supply, a failed inverter cannot be disconnected from the GND. The present inventor has found the problem that even when a neutral point is formed in a failed inverter under abnormal conditions, a current supplied to each phase winding through an inverter that is operating normally is not returned to that source inverter, and flows to the GND through the failed inverter. In other words, a closed loop of a drive current cannot be formed, and therefore, it is difficult to perform suitable current control.

Meanwhile, there has been a demand for a power conversion device that can perform suitable current control under both normal and abnormal conditions.

Embodiments of a power conversion device, motor drive unit, and electric power steering device according to the present disclosure will now be described in detail with reference to the accompanying drawings. To avoid unnecessarily obscuring the present disclosure, well-known features may not be described or substantially the same elements may not be redundantly described, for example. This is also for ease of understanding the present disclosure.

Firstly, an embodiment of the present disclosure will be described using, as an example, a power conversion device that converts power that is to be supplied to a three-phase motor having three phase (U-phase, V-phase, and W-phase) windings. As described below, the present disclosure encompasses a power conversion device that converts power that is to be supplied to an n-phase motor having n phase windings (n is an integer of three or more), such as a four-phase motor or a five-phase motor.

First Embodiment

Figure 1:
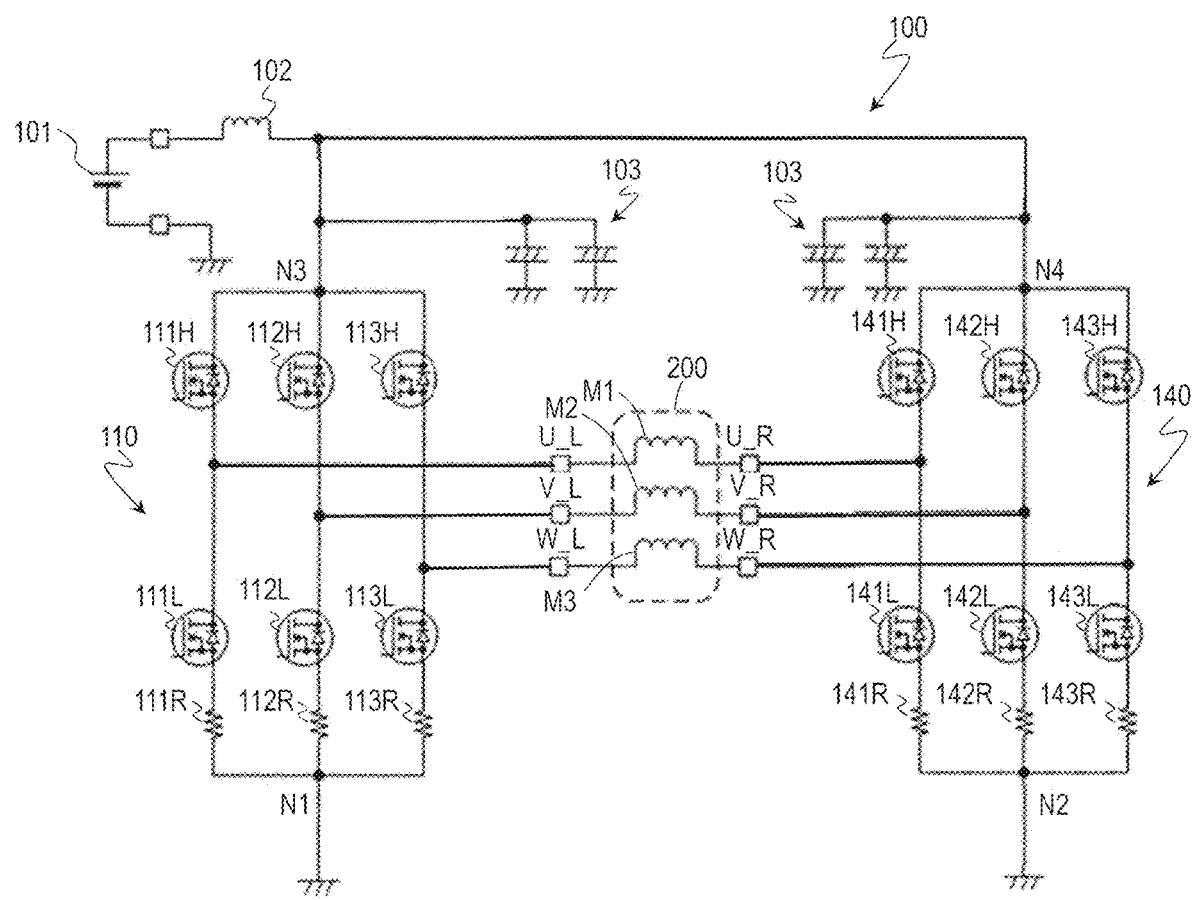
FIG. 1 is a circuit diagram showing a circuit configuration of a power conversion device according to an illustrative embodiment.

FIG. 1 schematically shows a circuit configuration of a power conversion device 100 according to this embodiment.

The power conversion device 100 includes a first inverter 110 and a second inverter 140. The power conversion device 100 also includes a control circuit 300 shown in FIG. 7. The power conversion device 100 can convert power that is to be supplied to various motors. A motor 200 is, for example, a three-phase AC motor. The motor 200 includes a U-phase winding M1, a V-phase winding M2, and a W-phase winding M3, and is coupled to the first inverter 110 and the second inverter 140. Specifically, the first inverter 110 is coupled to one end of each phase winding of the motor 200, and the second inverter 140 is coupled to the other end of each phase winding. As used herein, the terms "couple" and "connect" with respect to parts (components) mainly means an electrical coupling and connection between the parts.

The first inverter 110 has terminals U_L, V_L, and W_L which correspond to the respective phases, and the second inverter 140 has terminals U_R, V_R, and W_R which correspond to the respective phases. The terminal U_L of the first inverter 110 is coupled to one end of the U-phase winding M1, the terminal V_L is coupled to one end of the V-phase winding M2, and the terminal W_L is coupled to one end of the W-phase winding M3. As with the first inverter 110, the terminal U_R of the second inverter 140 is coupled to the other end of the U-phase winding M1, the terminal V_R is coupled to the other end of the V-phase winding M2, and the terminal W_R is coupled to the other end of the W-phase winding M3. Such coupling is different from the so-called star or delta coupling.

The first inverter 110 may also be herein referred to as a "bridge circuit L." The second inverter 140 may also be herein referred to as a "bridge circuit R." The first inverter 110 and the second inverter 140 each include three legs each including a low-side switching element and a high-side switching element. The switching elements included in these legs of the first inverter 110 and the second inverter 140, and the windings of the electric motor 200, form a plurality of H-bridges.

The first inverter 110 includes a bridge circuit including three legs. Switching elements 111L, 112L, and 113L shown in FIG. 1 are a low-side switching element, and switching elements 111H, 112H, and 113H shown in FIG. 1 are a high-side switching element. The switching elements may, for example, be a field-effect transistor (typically, a MOSFET) or an insulated-gate bipolar transistor (IGBT). It is, for example, herein assumed that the switching elements of the inverters are a FET, and in the description that follows, the switching elements may also be denoted by FETs. For example, the switching element 111L is denoted by the FET 111L.

Figure 7:
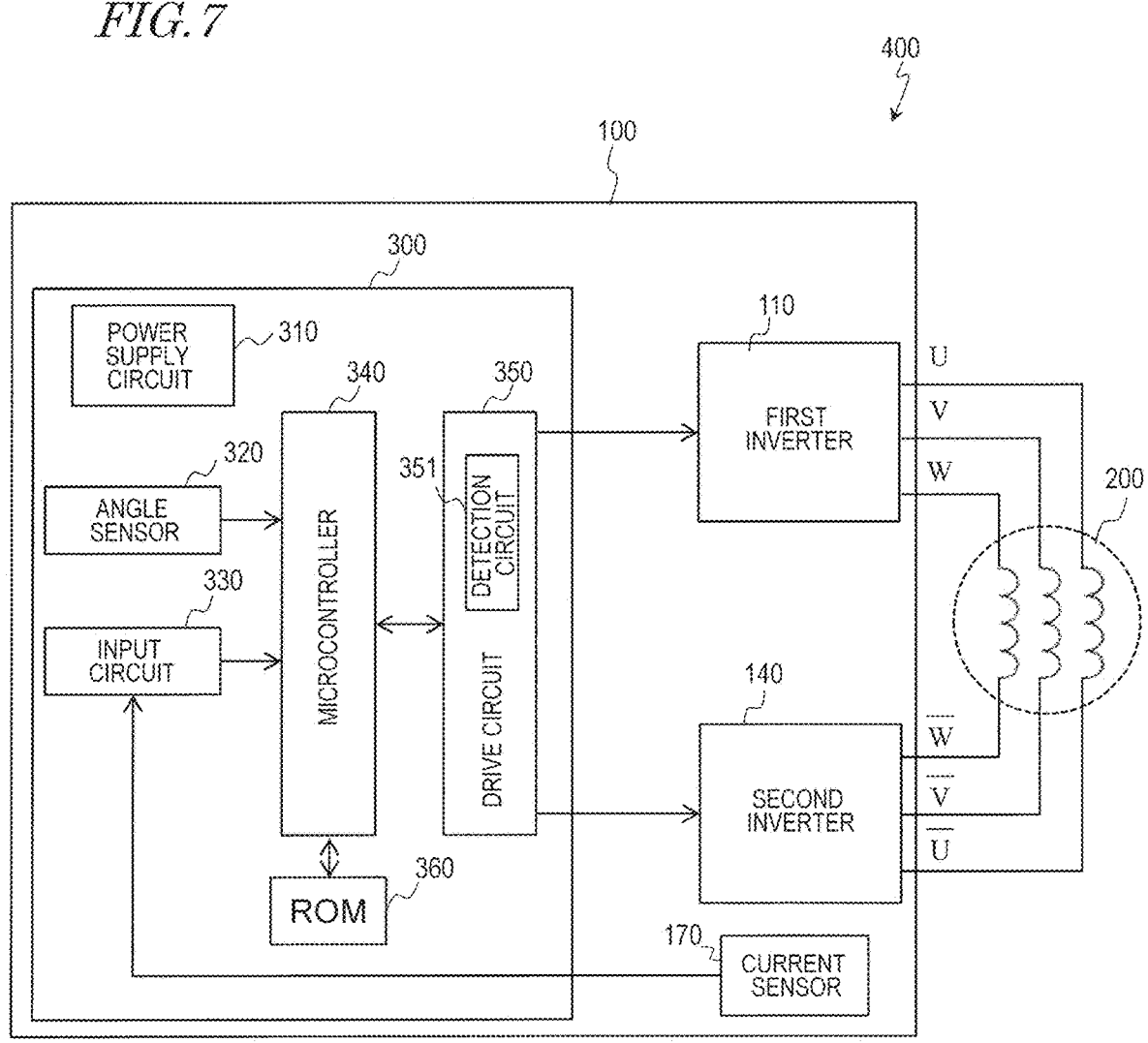
FIG. 7 is a block diagram showing a block configuration of a motor drive unit including a power conversion device according to an illustrative embodiment.

The first inverter 110 includes three shunt resistors 111R, 112R, and 113R as a current sensor for detecting currents flowing through the U-phase, V-phase, and W-phase windings (see FIG. 7). The current sensor 170 includes a current detection circuit (not shown) for detecting a current flowing through each shunt resistor. For example, the shunt resistors 111R, 112R, and 113R are each coupled between the corresponding one of the three low-side switching elements included in the three legs of the first inverter 110, and the ground. Specifically, the shunt resistor 111R is coupled between the FET 111L and the GND, the shunt resistor 112R is coupled between the FET 112L and the GND, and the shunt resistor 113R is coupled between the FET 113L and the GND. The shunt resistors have a resistance value of, for example, about 0.5-1.0 mΩ.

As with the first inverter 110, the second inverter 140 includes a bridge circuit including three legs. FETs 141L, 142L, and 143L shown in FIG. 1 are a low-side switching element, and FETs 141H, 142H, and 143H shown in FIG. 1 are a high-side switching element. The second inverter 140 also includes three shunt resistors 141R, 142R, and 143R. These shunt resistors are coupled between the three low-side switching elements included in the three legs and the ground. The FETs included in the first and second inverters 110 and 140 may be controlled by, for example, a microcontroller or dedicated driver.

Figure 2:
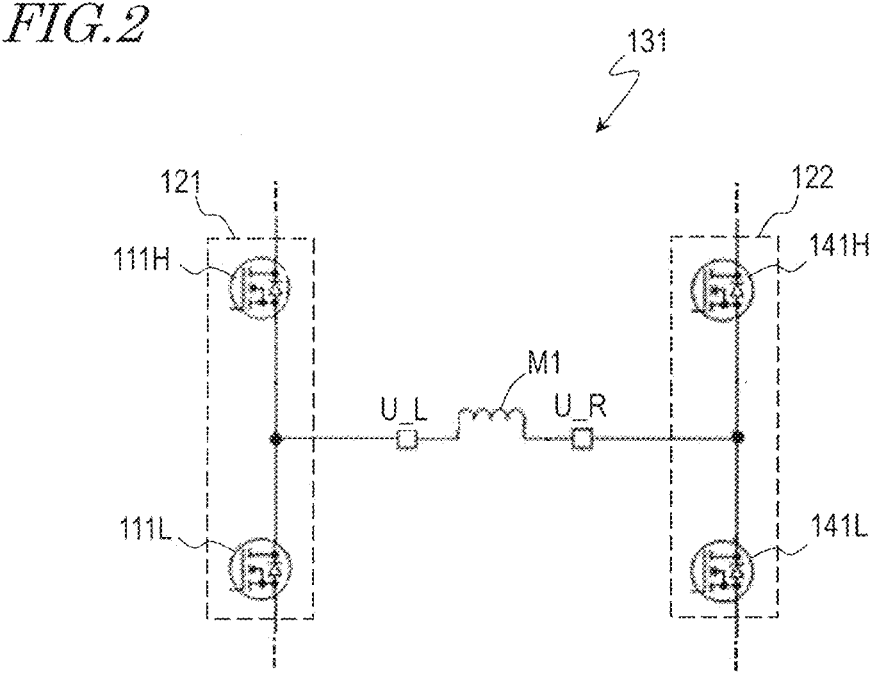
FIG. 2 is a diagram showing an H-bridge included in a power conversion device according to an illustrative embodiment.
Figure 3:
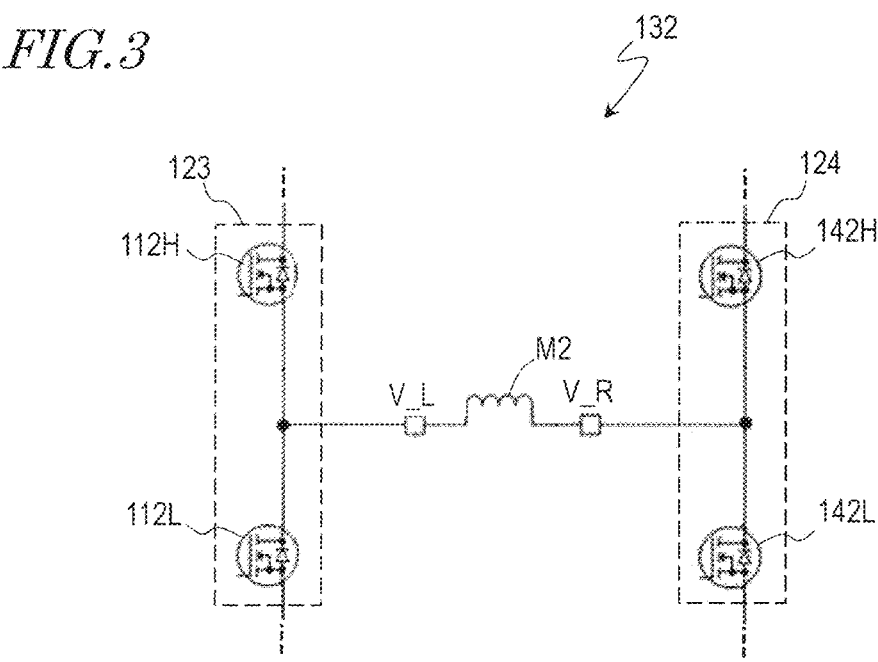
FIG. 3 is a diagram showing an H-bridge included in a power conversion device according to an illustrative embodiment.
Figure 4:
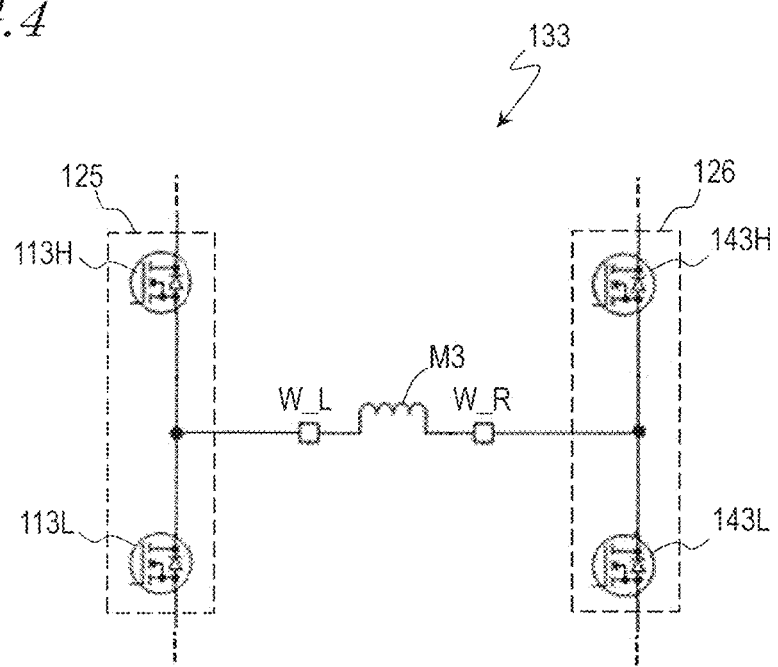
FIG. 4 is a diagram showing an H-bridge included in a power conversion device according to an illustrative embodiment.

FIGS. 2, 3, and 4 show three H-bridges 131, 132, and 133 included in the power conversion device 100.

The first inverter 110 has legs 121, 123, and 125. The leg 121 has a FET 111H and a FET 111L. The leg 123 has a FET 112H and a FET 112L. The leg 125 has a FET 113H and a FET 113L.

The second inverter 140 has legs 122, 124, and 126. The leg 122 has a FET 141H and a FET 141L. The leg 124 has a FET 142H and a FET 142L. The leg 126 has a FET 143H and a FET 143L.

The H-bridge 131 of FIG. 2 includes the leg 121, the winding M1, and the leg 122. The H-bridge 132 of FIG. 3 includes the leg 123, the winding M2, and the leg 124. The H-bridge 133 of FIG. 4 includes the leg 125, the winding M3, and the leg 126.

The power conversion device 100 is coupled between the power supply 101 and the GND. Specifically, the first and second inverters 110 and 140 are each coupled between the power supply 101 and the GND. Power is supplied from the power supply 101 to the first and second inverters 110 and 140.

The power supply 101 generates a predetermined power supply voltage. The power supply 101 may, for example, be a DC power supply. Note that the power supply 101 may be an AC/DC converter or DC/DC converter, or alternatively, a battery (electric battery). The power supply 101 may be a single power supply that is shared by the first and second inverters 110 and 140. Alternatively, the power supply 101 may include a first power supply for the first inverter 110 and a second power supply for the second inverter 140.

A coil 102 is provided between the power supply 101 and the power conversion device 100. The coil 102 functions as a noise filter to perform smoothing so that high-frequency noise contained in a voltage waveform supplied to each inverter or high-frequency noise occurring in each inverter does not flow to the power supply 101. A capacitor or capacitors 103 are coupled to power supply terminals of the inverters. The capacitor 103 is a so-called bypass capacitor, and prevents or reduces voltage ripple. The capacitor 103 is, for example, an electrolytic capacitor. The capacities and number of capacitors 103 that are used are determined as appropriate, taking into account design and specifications, etc.

In the example configuration of FIG. 1, a shunt resistor is provided in each leg of each inverter. Note that the first and second inverters 110 and 140 can include six or less shunt resistors. The six or less shunt resistors can be coupled between the six or less low-side switching elements of the six legs of the first and second inverters 110 and 140, and the GND. In the case where this configuration is extended to an n-phase motor, the first and second inverters 110 and 140 can include 2n or less shunt resistors. The 2n or less shunt resistors can be coupled between the 2n or less low-side switching elements of the 2n legs of the first and second inverters 110 and 140, and the GND.

Figure 5:
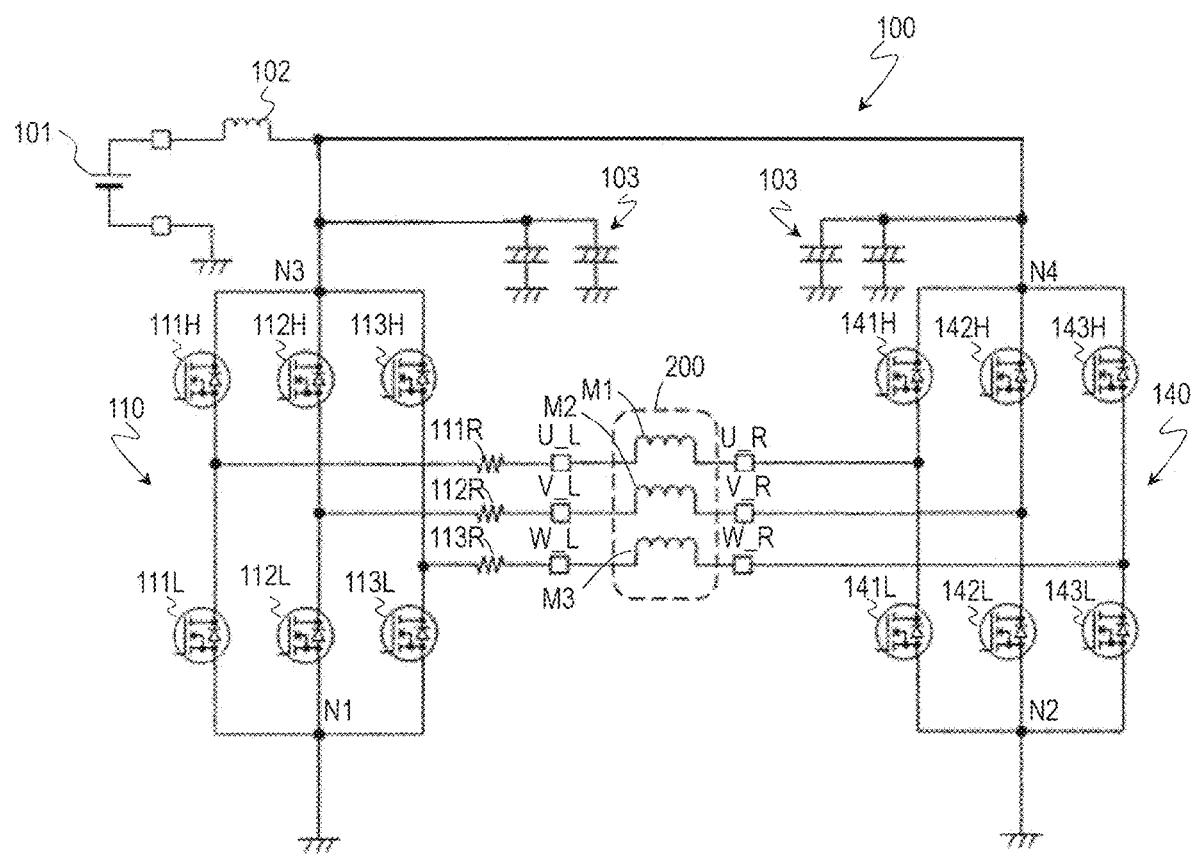
FIG. 5 is a circuit diagram showing another circuit configuration of a power conversion device according to an illustrative embodiment.

FIG. 5 schematically shows another circuit configuration of the power conversion device 100 of this embodiment. Three shunt resistors can be disposed between the legs of one of the first and second inverters 110 and 140 and the windings M1, M2, and M3. For example, as shown in FIG. 5, shunt resistors 111R, 112R, and 113R may each be disposed between the first inverter 110 and one end of the corresponding one of the windings M1, M2, and M3. As another example arrangement of shunt resistors, shunt resistors 111R and 112R may each be disposed between the first inverter 110 and one end of the corresponding one of the windings M1 and M2, and a shunt resistor 143R (FIG. 1) may be disposed between the second inverter 140 and the other end of the winding M3. In such a configuration, it is sufficient to dispose three shunt resistors for the U-, V-, and W-phases, and at least two shunt resistors are provided.

Figure 6:
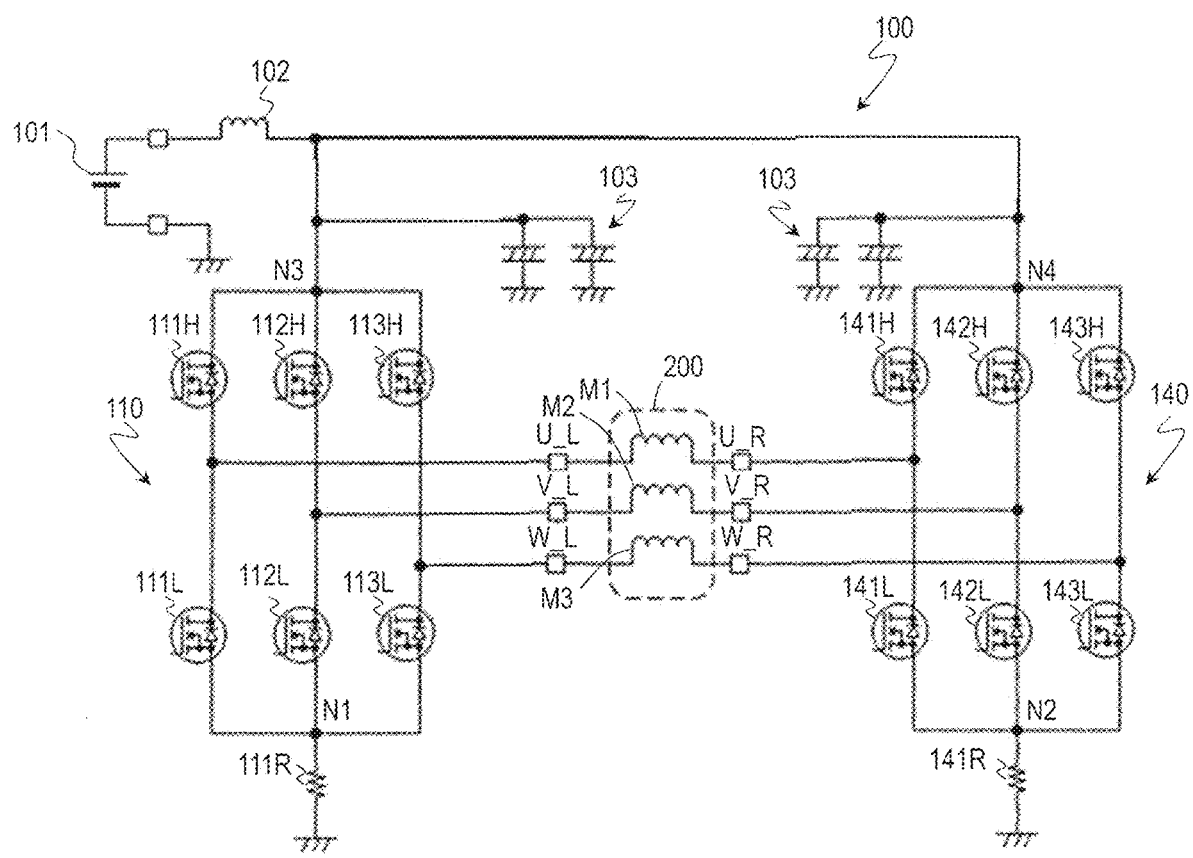
FIG. 6 is a circuit diagram showing still another circuit configuration of a power conversion device according to an illustrative embodiment.

FIG. 6 schematically shows still another circuit configuration of the power conversion device 100 of this embodiment. For example, a single shunt resistor may be provided in each inverter and shared by the phase windings. A single shunt resistor 111R is, for example, coupled between a low-side node N1 (coupling point of the legs) of the first inverter 110, and the GND. Another single shunt resistor 141R may, for example, be coupled between a low-side node N2 of the second inverter 140, and the GND. Note that, as with the low side, a single shunt resistor 111R may, for example, be coupled between a high-side node N3 of the first inverter 110, and the power supply 101. Another single shunt resistor 141R may, for example, be coupled between a high-side node N4 of the second inverter 140, and the power supply 101. Thus, the number of shunt resistors that are used, and the arrangement of the shunt resistors, are determined as appropriate, taking into account manufacturing cost, design, specifications, etc.

FIG. 7 schematically shows a block configuration of a motor drive unit 400 that includes the power conversion device 100. The power conversion device 100 includes a control circuit 300. The motor drive unit 400 includes the power conversion device 100 and the motor 200.

The control circuit 300 includes, for example, a power supply circuit 310, an angle sensor 320, an input circuit 330, a microcontroller 340, a drive circuit 350, and a ROM 360. The control circuit 300 controls the operation of the entire power conversion device 100 to drive the motor 200. Specifically, the control circuit 300 controls the rotor such that the rotor takes a desired position, rotational speed, and current, etc., and can achieve closed-loop control. Note that the control circuit 300 may include a torque sensor instead of the angle sensor. In this case, the control circuit 300 can control the rotor such that the rotor takes a desired motor torque.

The power supply circuit 310 generates a DC voltage (e.g., 3 V or 5 V) used for the circuit blocks. The angle sensor 320 is, for example, a resolver or Hall IC. The angle sensor 320 detects the angle of rotation of the rotor of the motor 200 (hereinafter referred to as a "rotation signal"), and outputs the rotation signal to the microcontroller 340. The input circuit 330 receives a motor current value (hereinafter referred to as an "actual current value") detected by the current sensor 170, and if necessary, converts the level of the actual current value into an input level of the microcontroller 340, and outputs the resultant actual current value to the microcontroller 340.

The microcontroller 340 controls the switching operation (turning-on or turning-off) of each FET in the first and second inverters 110 and 140 of the power conversion device 100. The microcontroller 340 calculates a desired current value on the basis of the actual current value and the rotor rotation signal, etc., to generate a PWM signal, and outputs the PWM signal to the drive circuit 350.

The drive circuit 350 is typically a gate driver. The drive circuit 350 generates control signals (gate control signals) for controlling the switching operations of the respective FETs in the first and second inverters 110 and 140, on the basis of the PWM signal, and outputs the control signals to the gates of the respective FETs. Note that the microcontroller 340 may also function as the drive circuit 350. In this case, the control circuit 300 may not include the drive circuit 350.

The ROM 360 is, for example, a writable memory, rewritable memory, or read-only memory. The ROM 360 stores a control program including instructions to cause the microcontroller 340 to control the power conversion device 100. For example, the control program is temporarily loaded to a RAM (not shown) during booting.

The power conversion device 100 performs control under normal conditions and control under abnormal conditions. The control circuit 300 (mainly the microcontroller 340) can switch the control of the power conversion device 100 from the control under normal conditions to the control under abnormal conditions.

(1. Control Under Normal Conditions)

Firstly, a specific example method for controlling the power conversion device 100 under normal conditions will be described. As described above, the term "normal conditions" means that none of the FETs in the first and second inverters 110 and 140 has failed.

Under normal conditions, the control circuit 300 performs three-phase conduction control using both of the first and second inverters 110 and 140 to drive the motor 200. Specifically, the control circuit 300 performs the three-phase conduction control by performing switching control on the FETs of the first inverter 110 and the FETs of the second inverter 140 using opposite phases (phase difference=180°). For example, in the case of an H-bridge including the FETs 111L, 111H, 141L, and 141H, when the FET 111L is turned on, the FET 141L is turned off, and when the FET 111L is turned off, the FET 141L is turned on. Similarly, when the FET 111H is turned on, the FET 141H is turned off, and when the FET 111H is turned off, the FET 141H is turned on. A current output from the power supply 101 flows through a high-side switching element, a winding, and a low-side switching element to the GND.

Figure 8:
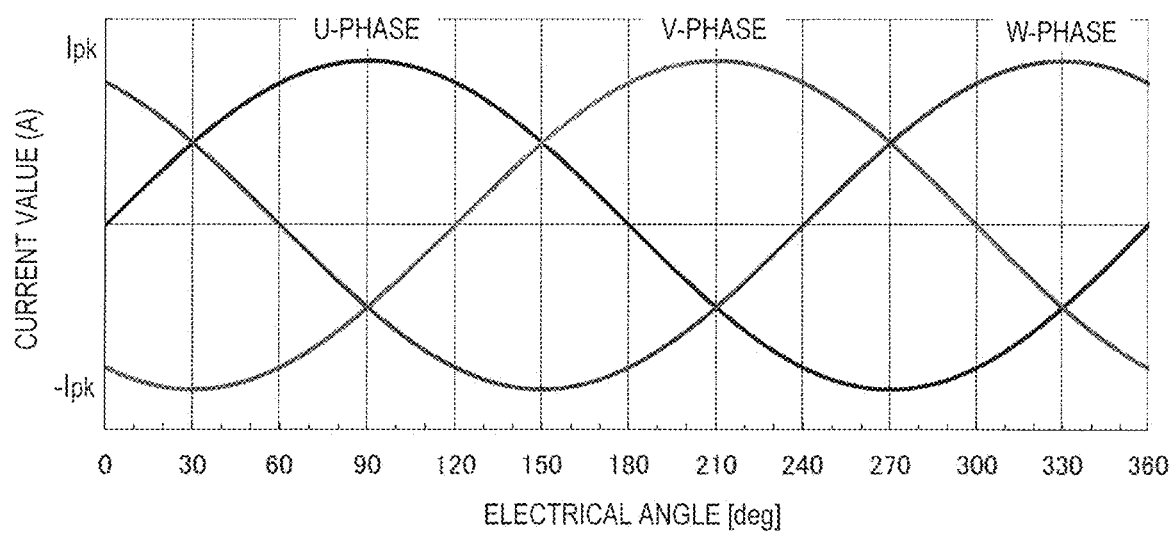
FIG. 8 is a diagram showing current waveforms (sine waves) that are obtained by plotting values of currents flowing through a U-phase, a V-phase, and a W-phase winding of a motor when a power conversion device is controlled by three-phase conduction control under normal conditions.

FIG. 8 shows example current waveforms (sine waves) that are obtained by plotting values of currents flowing through the U-phase, V-phase, and W-phase windings of the motor 200 when the power conversion device 100 is controlled by the three-phase conduction control under normal conditions. The horizontal axis represents motor electrical angles (deg), and the vertical axis represents current values (A). In the current waveforms of FIG. 8, current values are plotted every electrical angle of 30°. $I_{pk}$ represents the greatest current value (peak current value) of each phase.

Table 1 shows the values of currents flowing through the terminals of each inverter every predetermined electrical angle of the sine waves of FIG. 8. Specifically, Table 1 shows the values of currents flowing through the terminals U_L, V_L, and W_L of the first inverter 110 (the bridge circuit L) every electrical angle of 30°, and the values of currents flowing through the terminals U_R, V_R, and W_R of the second inverter 140 (the bridge circuit R) every electrical angle of 30°. Here, a positive current direction with respect to the bridge circuit L is defined as a direction in which a current flows from a terminal of the bridge circuit L to a terminal of the bridge circuit R. This definition applies to current directions shown in FIG. 8. A positive current direction with respect to the bridge circuit R is defined as a direction in which a current flows from a terminal of the bridge circuit R to a terminal of the bridge circuit L. Therefore, there is a phase difference of 180° between the current in the bridge circuit L and the current in the bridge circuit R. In Table 1, the magnitude of a current value $I_1$ is $[(3)^{1/2}/2]*I_{pk}$, and the magnitude of a current value $I_2$ is $I_{pk}/2$.

At an electrical angle of 180°, a current does not flow through the U-phase winding M1. A current having a magnitude of $I_1$ flows through the V-phase winding M2 from the bridge circuit L to the bridge circuit R, and a current having a magnitude of $I_1$ flows through the W-phase winding M3 from the bridge circuit R to the bridge circuit L.

At an electrical angle of 210°, a current having a magnitude of $I_2$ flows through the U-phase winding M1 from the bridge circuit R to the bridge circuit L, a current having a magnitude of $I_{pk}$ flows through the V-phase winding M2 from the bridge circuit L to the bridge circuit R, and a current having a magnitude of $I_2$ flows through the W-phase winding M3 from the bridge circuit R to the bridge circuit L.

TABLE 1

| Operation under normal conditions | | Electrical angles [deg] | | | | | | | | | | |
|---|---|---|---|---|---|---|---|---|---|---|---|---|
| | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electrical angle of 0°, a current does not flow through the U-phase winding M1. A current having a magnitude of $I_1$ flows through the V-phase winding M2 from the bridge circuit R to the bridge circuit L, and a current having a magnitude of $I_1$ flows through the W-phase winding M3 from the bridge circuit L to the bridge circuit R.

At an electrical angle of 30°, a current having a magnitude of $I_2$ flows through the U-phase winding M1 from the bridge circuit L to the bridge circuit R, a current having a magnitude of $I_{pk}$ flows through the V-phase winding M2 from the bridge circuit R to the bridge circuit L, and a current having a magnitude of $I_2$ flows through the W-phase winding M3 from the bridge circuit L to the bridge circuit R.

At an electrical angle of 60°, a current having a magnitude of $I_1$ flows through the U-phase winding M1 from the bridge circuit L to the bridge circuit R, and a current having a magnitude of $I_1$ flows through the V-phase winding M2 from the bridge circuit R to the bridge circuit L. A current does not flow through the W-phase winding M3.

At an electrical angle of 90°, a current having a magnitude of $I_{pk}$ flows through the U-phase winding M1 from the bridge circuit L to the bridge circuit R, a current having a magnitude of $I_2$ flows through the V-phase winding M2 from the bridge circuit R to the bridge circuit L, and a current having a magnitude of $I_2$ flows through the W-phase winding M3 from the bridge circuit R to the bridge circuit L.

At an electrical angle of 120°, a current having a magnitude of $I_1$ flows through the U-phase winding M1 from the bridge circuit L to the bridge circuit R, and a current having a magnitude of $I_1$ flows through the W-phase winding M3 from the bridge circuit R to the bridge circuit L. A current does not flow through the V-phase winding M2.

At an electrical angle of 150°, a current having a magnitude of $I_2$ flows through the U-phase winding M1 from the bridge circuit L to the bridge circuit R, a current having a magnitude of $I_2$ flows through the V-phase winding M2 from the bridge circuit L to the bridge circuit R, and a current having a magnitude of $I_{pk}$ flows through the W-phase winding M3 from the bridge circuit R to the bridge circuit L.

At an electrical angle of 240°, a current having a magnitude of $I_1$ flows through the U-phase winding M1 from the bridge circuit R to the bridge circuit L, and a current having a magnitude of $I_1$ flows through the V-phase winding M2 from the bridge circuit L to the bridge circuit R. A current does not flow through the W-phase winding M3.

At an electrical angle of 270°, a current having a magnitude of $I_{pk}$ flows through the U-phase winding M1 from the bridge circuit R to the bridge circuit L, a current having a magnitude of $I_2$ flows through the V-phase winding M2 from the bridge circuit L to the bridge circuit R, and a current having a magnitude of $I_2$ flows through the W-phase winding M3 from the bridge circuit L to the bridge circuit R.

At an electrical angle of 300°, a current having a magnitude of $I_1$ flows through the U-phase winding M1 from the bridge circuit R to the bridge circuit L, and a current having a magnitude of $I_1$ flows through the W-phase winding M3 from the bridge circuit L to the bridge circuit R. A current does not flow through the V-phase winding M2.

At an electrical angle of 330°, a current having a magnitude of $I_2$ flows through the U-phase winding M1 from the bridge circuit R to the bridge circuit L, a current having a magnitude of $I_2$ flows through the V-phase winding M2 from the bridge circuit R to the bridge circuit L, and a current having a magnitude of $I_{pk}$ flows through the W-phase winding M3 from the bridge circuit L to the bridge circuit R.

In the three-phase conduction control of this embodiment, the sum of currents flowing through the three phase windings is invariably "0" at any electrical angle, where the directions of currents are taken into account. For example, the control circuit 300 controls the switching operations of the FETs of the bridge circuits L and R by PWM control such that the current waveforms of FIG. 8 are obtained.

(2. Control Under Abnormal Conditions)

A specific example method for controlling the power conversion device 100 under abnormal conditions will be described. As described above, the term "abnormal conditions" mainly means that a FET(s) has failed. Failures of a FET are roughly divided into an "open-circuit failure" and a "short-circuit failure." The "open-circuit failure" with respect to a FET means that there is an open circuit between the source and drain of the FET (in other words, a resistance rds between the source and drain has a high impedance). The "short-circuit failure" with respect to a FET means that there is a short circuit between the source and drain of the FET.

Referring back to FIG. 1, it is considered that, during the operation of the power conversion device 100, a random failure occurs in which one of the 12 FETs of the two inverters randomly fails. The present disclosure is mainly directed to a method for controlling the power conversion device 100 when a random failure has occurred. Note that the present disclosure is also directed to a method for controlling the power conversion device 100 when multiple FETs have failed together, etc. Such a multi-failure means that, for example, a failure occurs in the high-side and low-side switching elements of one leg simultaneously.

When the power conversion device 100 is used for a long period of time, a random failure is likely to occur. Note that the random failure is different from the manufacture failure that may occur during manufacture. When even one of the FETs in the two inverters fails, the normal three-phase conduction control can be no longer carried out.

The drive circuit 350 of this embodiment includes the detection circuit 351 for detecting a failure in a plurality of FETs included in the first inverter 110 and the second inverter 140. Each FET has a gate electrode, a source electrode, and a drain electrode. A failure may be detected as follows, for example. The detection circuit 351 monitors the drain-source voltage Vds of a FET, and compares the voltage Vds with a predetermined threshold voltage, in order to detect a failure in the FET. The threshold voltage is set in the drive circuit 350 by, for example, data communication with an external IC (not shown), and an external part. The drive circuit 350 is coupled to a port of the microcontroller 340, and sends a failure detection signal to the microcontroller 340. For example, the drive circuit 350, when detecting a failure in a FET, asserts the failure detection signal. The microcontroller 340, when receiving an asserted failure detection signal, reads internal data from the drive circuit 350, and determines which of the FETs of the two inverters has failed.

In this embodiment, the drive circuit 350 includes the detection circuit 351 for detecting a failure in a FET. Such a detection circuit for detecting a failure in a FET may be provided separately from the drive circuit 350. Alternatively, a failure may be detected as follows, for example. The microcontroller 340 may detect a failure in a FET on the basis of a difference between an actual current value of the motor and a desired current value. Note that the detection of a failure in a FET is not limited to these techniques, and may be performed using a wide variety of known techniques related to the detection of a failure in a FET.

The microcontroller 340, when receiving an asserted failure detection signal, switches the control of the power conversion device 100 from the control under normal conditions to the control under abnormal conditions. For example, a timing at which the control of the power conversion device 100 is switched from the control under normal conditions to the control under abnormal conditions is about 10-30 msec after the assertion of a failure detection signal.

Figure 9:
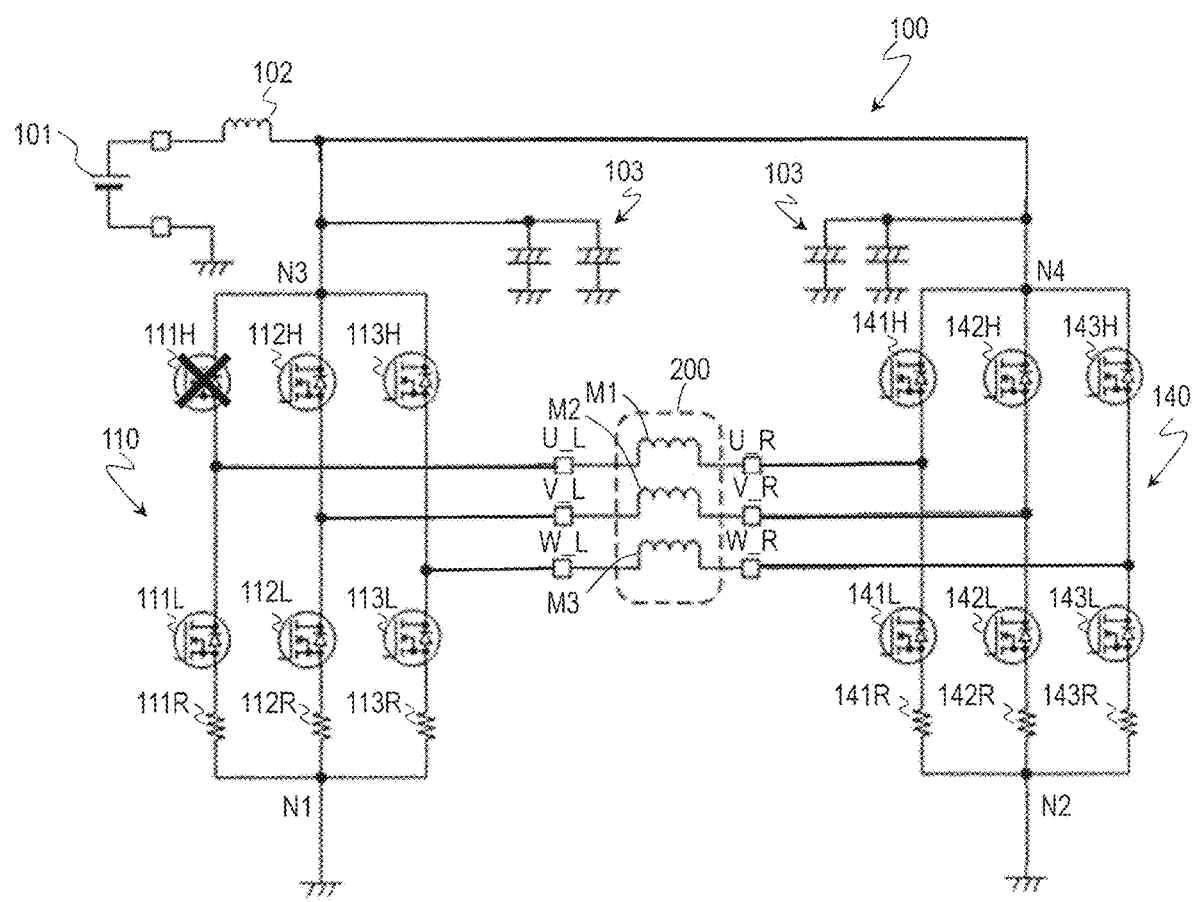
FIG. 9 is a schematic diagram showing a power conversion device according to an illustrative embodiment under abnormal conditions.
Figure 10:
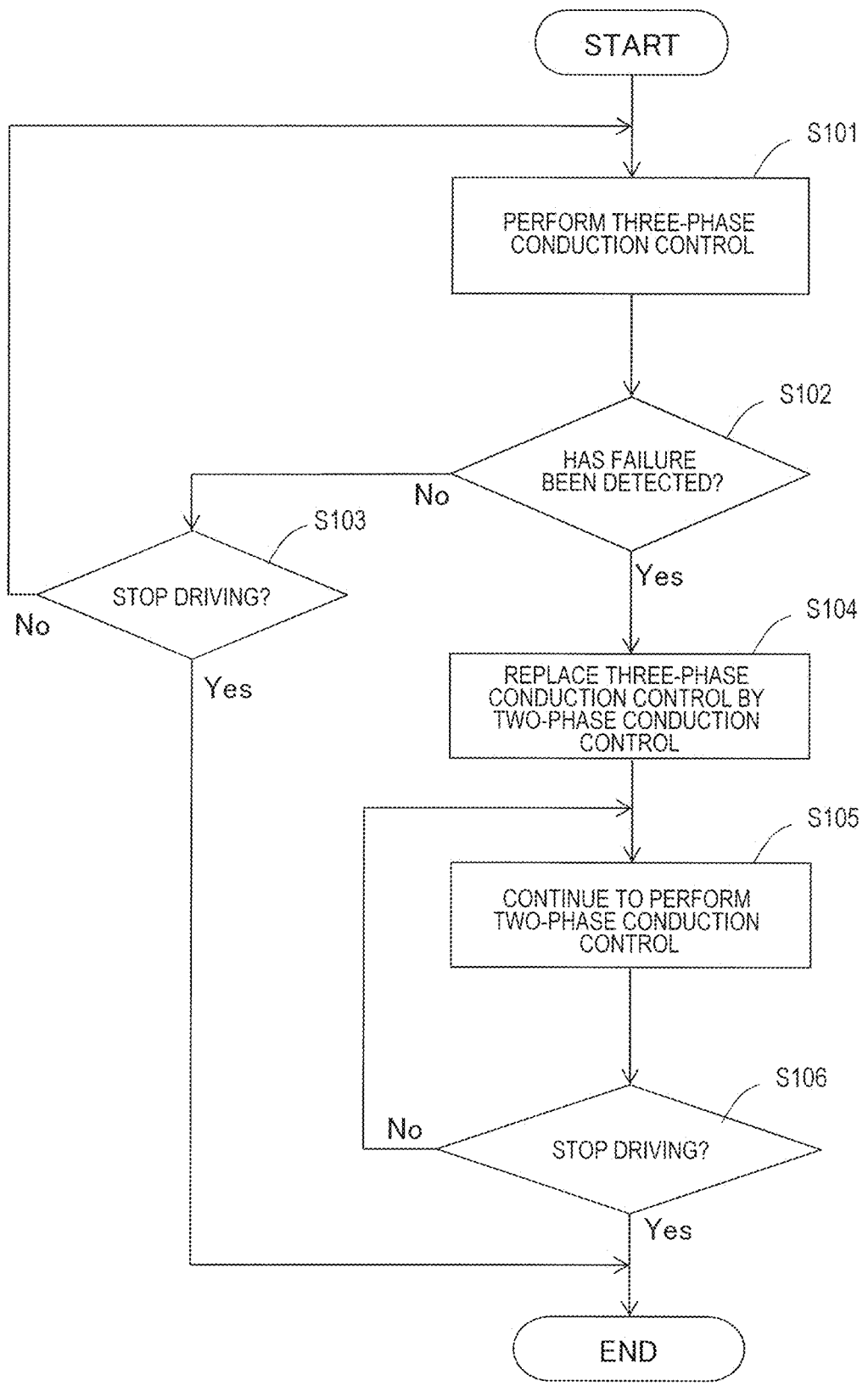
FIG. 10 is a flowchart showing an operation of a power conversion device according to an illustrative embodiment.
Figure 11:
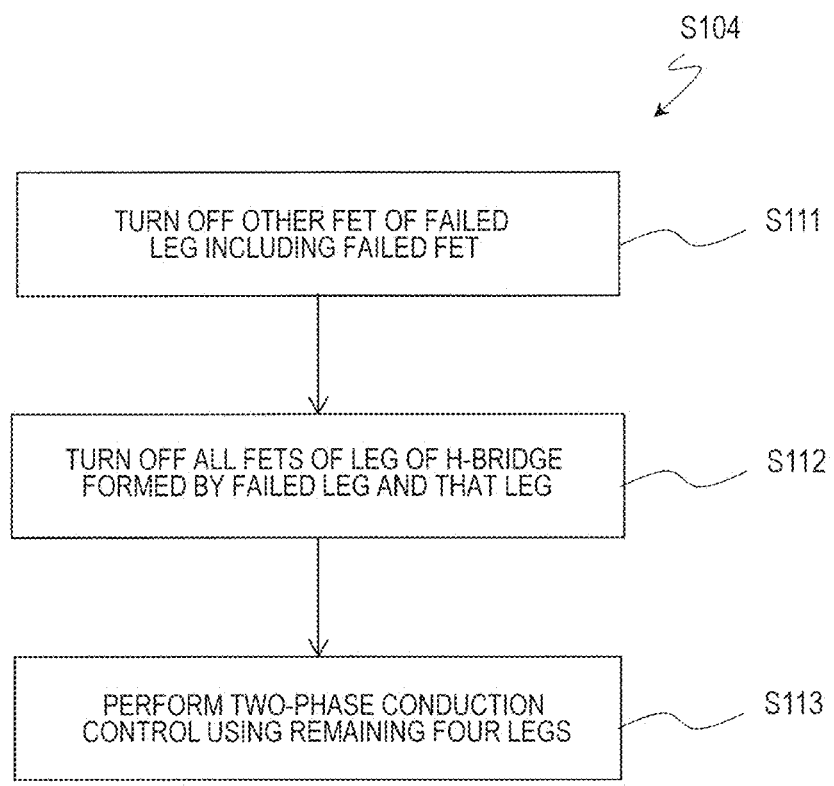
FIG. 11 is a flowchart showing an operation of a power conversion device according to an illustrative embodiment.

FIG. 9 is a diagram showing a situation that a U-phase FET has failed in the power conversion device 100. FIG. 10 is a flowchart showing an operation of the power conversion device 100. FIG. 11 is a flowchart showing details of an operation in step S104 shown in FIG. 10.

Under normal conditions, i.e., when a FET failure has not been detected, the control circuit 300 performs the three-phase conduction control on the first inverter 110 and the second inverter 140 (step S101).

The drive circuit 350 monitors whether or not any FET has failed in the first inverter 110 or the second inverter 140 (step S102). If the drive circuit 350 has not detected a failure (NO in step S102) and the control circuit 300 has not received a command to stop driving the power conversion device 100 (NO in step S103), the control circuit 300 continues to perform the three-phase conduction control. During the continuation of the three-phase conduction control, if the control circuit 300 has received a command to stop driving the power conversion device 100 (YES in step S103), the control circuit 300 stops driving the power conversion device 100.

If the drive circuit 350 has detected a failure in a FET (YES in step S102), the control circuit 300 changes the control of the first inverter 110 and the second inverter 140 from the three-phase conduction control to two-phase conduction control (step S104). In this case, the two-phase conduction control is performed using two phases different from one of the three phases that corresponds to a winding coupled to the failed FET.

For example, as shown in FIG. 9, it is assumed that the FET 111H of the first inverter 110 has failed. In this example, it is assumed that an open-circuit failure has occurred in the FET 111H. In this case, the control circuit 300 turns off the other FET 111L of the leg 121 (FIG. 2) including the failed FET 111H (step S111). In addition, the control circuit 300 turns off all the FETs 141H and 141L of the leg 122 of the second inverter 140 which is included in the H-bridge 131 formed by the failed leg 121 and the leg 122 (step S112). The operations in steps S111 and S112 may be simultaneously performed.

The control circuit 300 performs the two-phase conduction control using the other four legs 123, 124, 125, and 126 (FIGS. 3 and 4) different from the failed leg 121 including the failed FET 111H and the leg 122 included in the H-bridge 131 formed by the failed leg 121 and the leg 122 (step S113). In other words, the control circuit 300 performs the two-phase conduction control using the other two H-bridges 132 and 133 (V-phase and W-phase) different from the H-bridge 131 (U-phase) including the failed FET 111H.

After changing from the three-phase conduction control to the two-phase conduction control, the control circuit 300 continues to perform the two-phase conduction control on the power conversion device 100 (step S105). If the control circuit 300 has not received a command to stop driving the power conversion device 100 (NO in step S106), the control circuit 300 continues to perform the two-phase conduction control. If the control circuit 300 has received a command to stop driving the power conversion device 100 (YES in step S106), the control circuit 300 stops driving the power conversion device 100.

Figure 12:
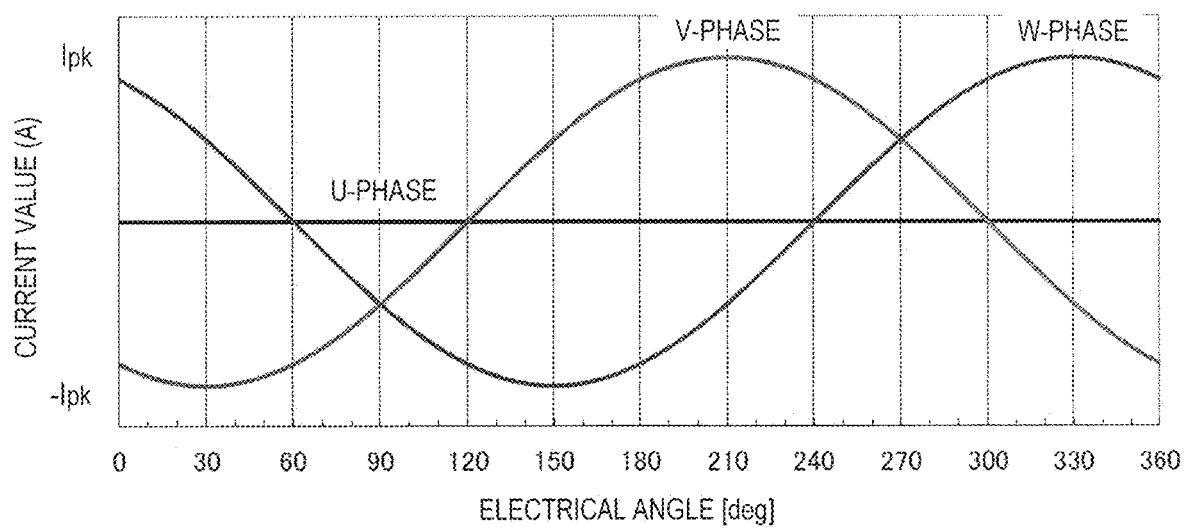
FIG. 12 is a diagram showing current waveforms that are obtained by plotting values of currents flowing through a U-phase, a V-phase, and a W-phase winding of a motor during control under abnormal conditions according to an illustrative embodiment.

FIG. 12 shows example current waveforms (sine waves) that are obtained by plotting values of currents flowing through the U-phase, V-phase, and W-phase windings of the motor 200 when the power conversion device 100 is controlled by the two-phase conduction control. In this example, the two-phase conduction control is performed using the V-phase and the W-phase and without using the U-phase. The horizontal axis represents motor electrical angles (deg), and the vertical axis represents current values (A). As in FIG. 8, in the current waveforms of FIG. 12, current values are plotted every electrical angle of 30°. $I_{pk}$ represents the greatest current value (peak current value) of each phase.

Table 2 shows the values of currents flowing through the terminals of each inverter every predetermined electrical angle of the sine waves of FIG. 12. As with Table 1, Table 2 shows the values of currents flowing through the terminals U_L, V_L, and W_L of the first inverter 110 (the bridge circuit L) every electrical angle of 30°. Table 2 also shows the values of currents flowing through the terminals U_R, V_R, and W_R of the second inverter 140 (the bridge circuit R) every electrical angle of 30°.

FET 112L. In this case, the control circuit 300 turns off the other FET 112H of the leg 123 (FIG. 3) including the failed FET 112L (step S111). In addition, the control circuit 300 turns off all the FETs 142H and 142L of the leg 124 of the second inverter 140 which is included in the H-bridge 132 formed by the failed leg 123 and the leg 124 (step S112). The operations in steps S111 and S112 may be simultaneously performed.

TABLE 2

|  |  | Electrical angles [deg] | | | | | | | | | | | |
|---|---|---|---|---|---|---|---|---|---|---|---|---|---|
| Operation under normal conditions | | 0 (360) | 30 | 60 | 90 | 120 | 150 | 180 | 210 | 240 | 270 | 300 | 330 |
| Bridge circuit L | U_L phase | OFF | OFF | OFF | OFF | OFF | OFF | OFF | OFF | OFF | OFF | OFF | OFF |
|  | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
|  | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | OFF | OFF | OFF | OFF | OFF | OFF | OFF | OFF | OFF | OFF | OFF | OFF |
|  | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
|  | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

In this example, the U-phase is not used, and therefore, a current does not flow through the terminal U_L or U_R. The two-phase conduction control is performed using the V-phase and the W-phase. Currents similar to those shown in Table 1 flow through the terminals V_L, W_L, V_R, and W_R. The control circuit 300 controls the switching operations of the FETs in the bridge circuits L and R by PWM control such that currents flowing through the phases have values shown in Table 2.

In the event of a short-circuit failure in the FET 111H, a voltage is applied through the FET 111H to the winding M1. However, all the other FETs 111L, 141H, and 141L of the same U-phase are off, and therefore, a current does not flow through the winding M1. Therefore, the two-phase conduction control can be performed.

In the event of a failure in any of the other FETs 111L, 141H, and 141L different from the FET 111H in the H-bridge 131, the two-phase conduction control can be performed as in the above case.

Thus, when a failure has been detected in a FET included in the first inverter 110 or the second inverter 140, the control of the first inverter 110 and the second inverter 140 is changed from the three-phase conduction control to the two-phase conduction control. As a result, even in the event of a failure in a FET included in the first inverter 110 or the second inverter 140, the motor 200 can continue to be driven to rotate.

Figure 13:
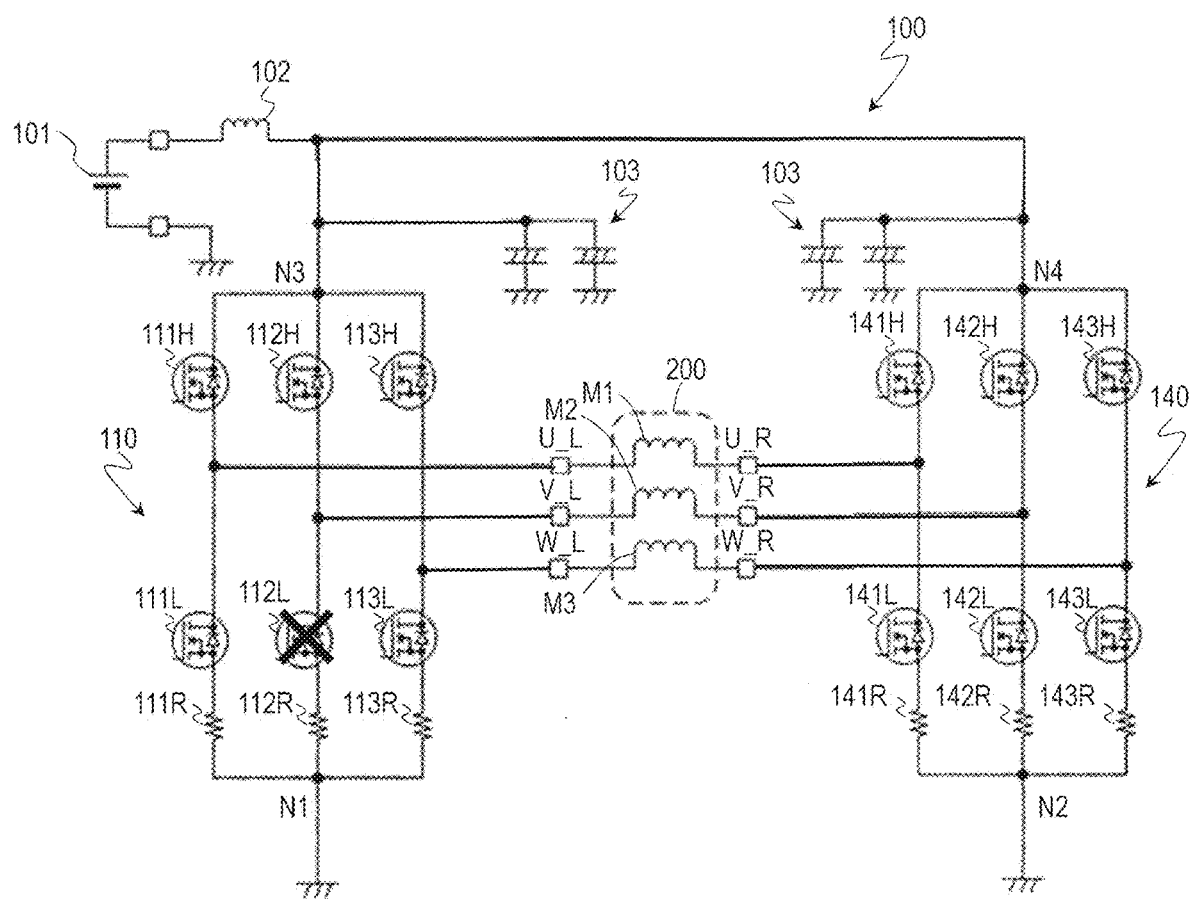
FIG. 13 is a schematic diagram showing a power conversion device according to an illustrative embodiment under abnormal conditions.

FIG. 13 is a diagram showing a situation that a V-phase FET has failed in the power conversion device 100. In this example, the FET 112L of the first inverter 110 has failed. It is assumed that an open-circuit failure has occurred in the The control circuit 300 performs the two-phase conduction control using the other four legs 121, 122, 125, and 126 (FIGS. 2 and 4) different from the failed leg 123 including the failed FET 112L and the leg 124 included in the H-bridge 132 formed by the failed leg 123 and the leg 124 (step S113). In other words, the control circuit 300 performs the two-phase conduction control using the other two H-bridges 131 and 133 (U-phase and W-phase) different from the H-bridge 132 (V-phase) including the failed FET 112L.

Figure 14:
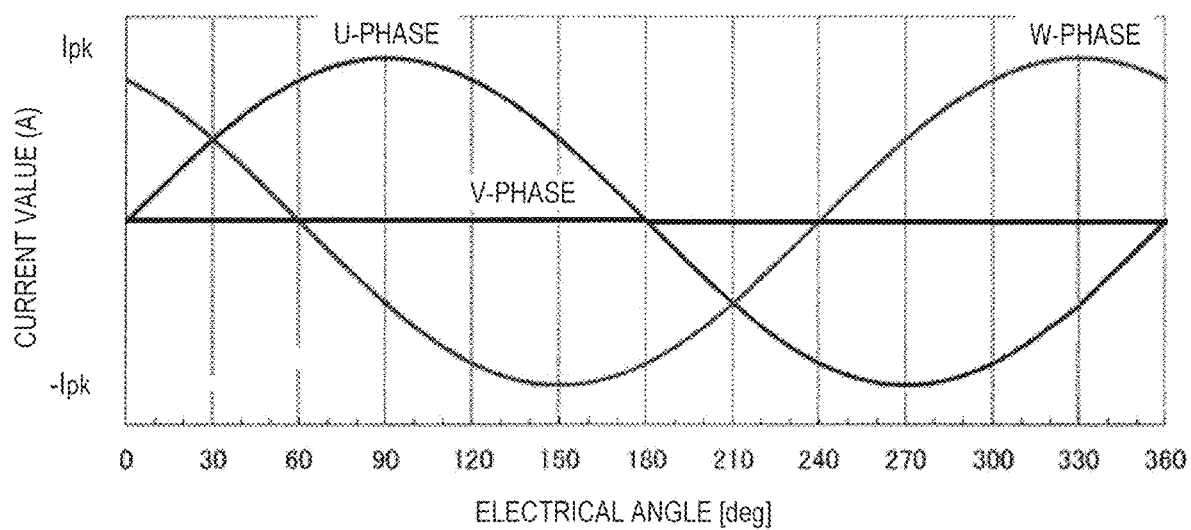
FIG. 14 is a diagram showing current waveforms that are obtained by plotting values of currents flowing through a U-phase, a V-phase, and a W-phase winding of a motor during control under abnormal conditions according to an illustrative embodiment.

FIG. 14 shows example current waveforms (sine waves) that are obtained by plotting values of currents flowing through the U-phase, V-phase, and W-phase windings of the motor 200 when the power conversion device 100 is controlled by the two-phase conduction control. In this example, the two-phase conduction control is performed using the U-phase and the W-phase and without using the V-phase. The horizontal axis represents motor electrical angles (deg), and the vertical axis represents current values (A). As in FIG. 8, in the current waveforms of FIG. 14, current values are plotted every electrical angle of 30°. $I_{pk}$ represents the greatest current value (peak current value) of each phase.

Table 3 shows the values of currents flowing through the terminals of each inverter every predetermined electrical angle of the sine waves of FIG. 14. As in Table 1, Table 3 shows the values of currents flowing through the terminals U_L, V_L, and W_L of the first inverter 110 (the bridge circuit L) every electrical angle of 30°. Table 3 also shows the values of currents flowing through the terminals U_R, V_R, and W_R of the second inverter 140 (the bridge circuit R) every electrical angle of 30°.

TABLE 3

|  |  | Electrical angles [deg] | | | | | | | | | | | |
|---|---|---|---|---|---|---|---|---|---|---|---|---|---|
| Operation under normal conditions | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
|  | V_L phase | OFF | OFF | OFF | OFF | OFF | OFF | OFF | OFF | OFF | OFF | OFF | OFF |
|  | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
|  | V_R phase | OFF | OFF | OFF | OFF | OFF | OFF | OFF | OFF | OFF | OFF | OFF | OFF |
|  | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ | example, the FET 112L of the first inverter 110 has failed. It is assumed that an open-circuit failure has occurred in the In this example, the V-phase is not used, and therefore, a current does not flow through the terminal V_L or V_R. The two-phase conduction control is performed using the U-phase and the W-phase. Currents similar to those shown in Table 1 flow through the terminals U_L, W_L, U_R, and W_R. The control circuit 300 controls the switching operations of the FETs in the bridge circuits L and R by PWM control such that currents flowing through the phases have values shown in Table 3.

In the event of a short-circuit failure in the FET 112L, the winding M2 is connected to the ground. However, all the other FETs 112H, 142H, and 142L of the same V-phase are off, and therefore, a current does not flow through the winding M2. Therefore, the two-phase conduction control can be performed.

In the event of a failure in any of the other FETs 112H, 142H, and 142L different from the FET 112L in the H-bridge 132, the two-phase conduction control can be performed as in the above case.

Thus, when a failure has been detected in a FET included in the first inverter 110 or the second inverter 140, the control of the first inverter 110 and the second inverter 140 is changed from the three-phase conduction control to the two-phase conduction control. As a result, even in the event of a failure in a FET included in the first inverter 110 or the second inverter 140, the motor 200 can continue to be driven to rotate.

Figure 15:
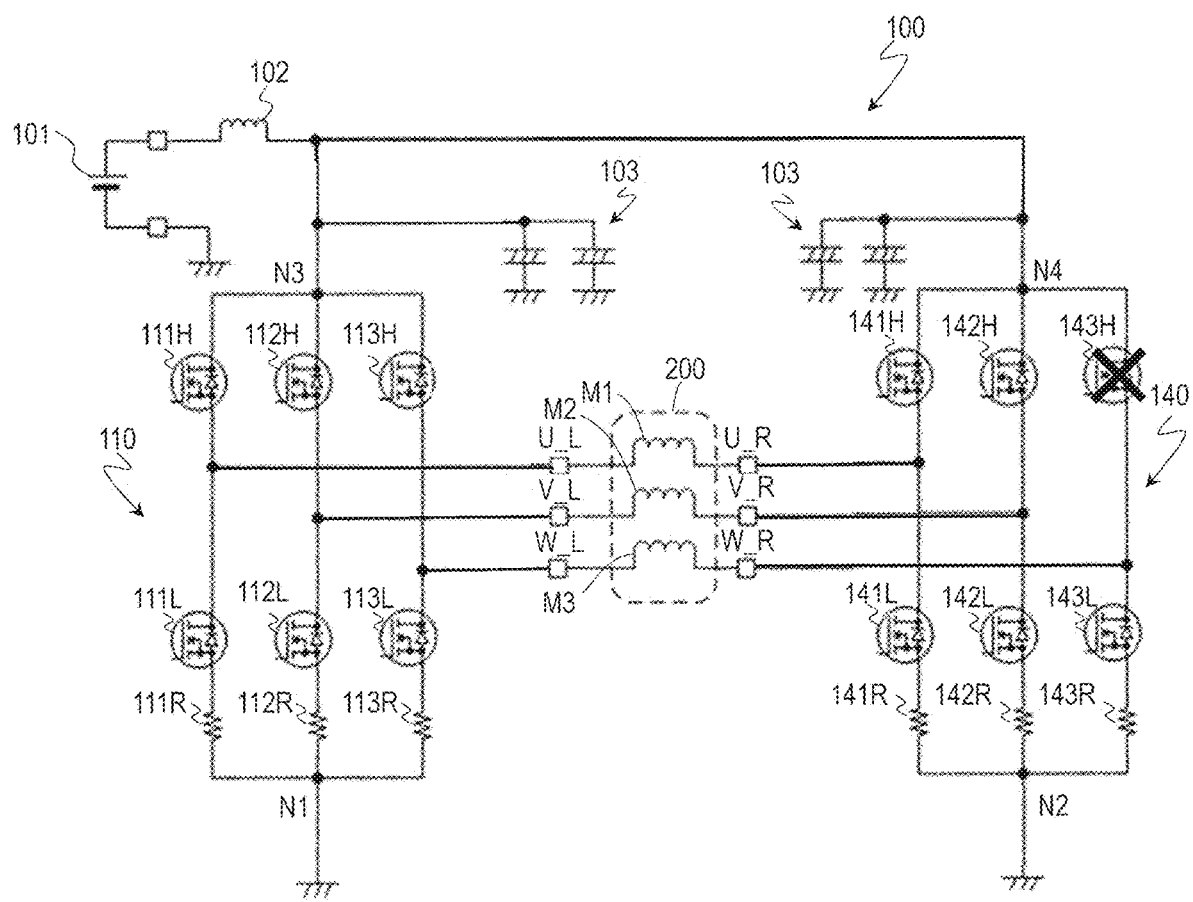
FIG. 15 is a schematic diagram showing a power conversion device according to an illustrative embodiment under abnormal conditions.

FIG. 15 is a diagram showing a situation that a W-phase FET has failed in the power conversion device 100. In this example, the FET 143H of the second inverter 140 has failed. It is assumed that an open-circuit failure has occurred in the FET 143H. In this case, the control circuit 300 turns off the other FET 143L of the leg 126 (FIG. 4) including the failed FET 143H (step S111). In addition, the control circuit 300 turns off all the FETs 113H and 113L of the leg 125 of the first inverter 110 which is included in the H-bridge 133 formed by the failed legs 126 and the leg 125 (step S112). The operations in steps S111 and S112 may be simultaneously performed.

The control circuit 300 performs the two-phase conduction control using the other four legs 121, 122, 123, and 124 (FIGS. 2 and 3) different from the failed leg 126 including the failed FET 143H and the leg 125 included in the H-bridge 133 formed by the failed leg 126 and the leg 125 (step S113). In other words, the control circuit 300 performs the two-phase conduction control using the other two H-bridges 131 and 132 (U-phase and V-phase) different from the H-bridge 133 (W-phase) including the failed FET 143H.

Figure 16:
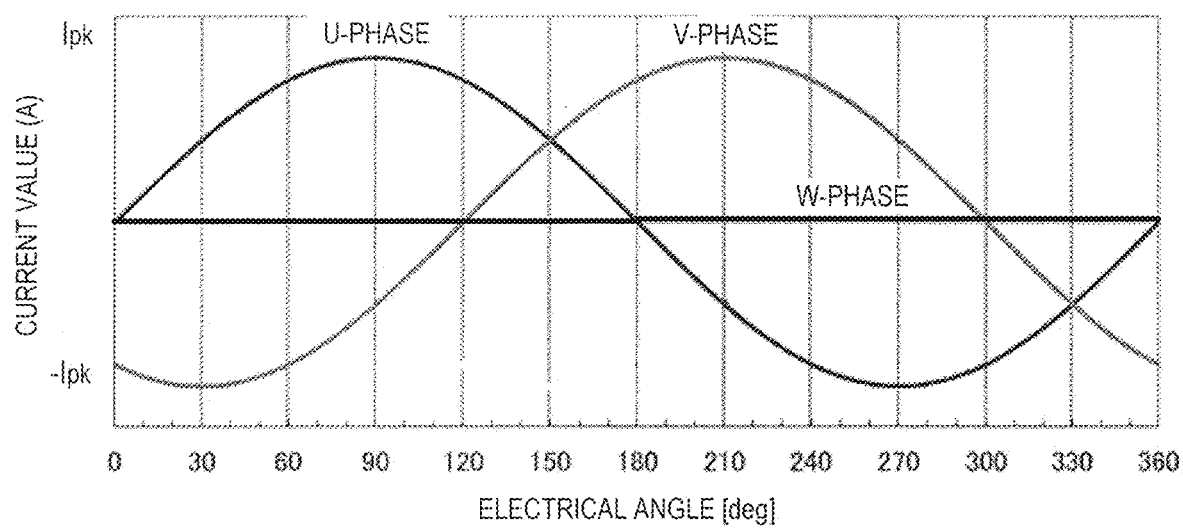
FIG. 16 is a diagram showing current waveforms that are obtained by plotting values of currents flowing through a U-phase, a V-phase, and a W-phase winding of a motor during control under abnormal conditions according to an illustrative embodiment.

FIG. 16 shows example current waveforms (sine waves) that are obtained by plotting values of currents flowing through the U-phase, V-phase, and W-phase windings of the motor 200 when the power conversion device 100 is controlled by the two-phase conduction control. In this example, the two-phase conduction control is performed using the U-phase and the V-phase and without using the W-phase. The horizontal axis represents motor electrical angles (deg), and the vertical axis represents current values (A). As in FIG. 8, in the current waveforms of FIG. 16, current values are plotted every electrical angle of 30°. $I_{pk}$ represents the greatest current value (peak current value) of each phase.

Table 4 shows the values of currents flowing through the terminals of each inverter every predetermined electrical angle of the sine waves of FIG. 16. As with Table 1, Table 4 shows the values of currents flowing through the terminals U_L, V_L, and W_L of the first inverter 110 (the bridge circuit L) every electrical angle of 30°. Table 4 also shows the values of currents flowing through the terminals U_R, V_R, and W_R of the second inverter 140 (the bridge circuit R) every electrical angle of 30°.

TABLE 4

| | | Electrical angles [deg] | | | | | | | | | | |
|---|---|---|---|---|---|---|---|---|---|---|---|---|
| | Operation under normal conditions | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | OFF | OFF | OFF | OFF | OFF | OFF | OFF | OFF | OFF | OFF | OFF | OFF |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | OFF | OFF | OFF | OFF | OFF | OFF | OFF | OFF | OFF | OFF | OFF | OFF |

In this example, the W-phase is not used, and therefore, a current does not flow through the terminal W_L or W_R. The two-phase conduction control is performed using the U-phase and the V-phase. Currents similar to those shown in Table 1 flow through the terminals U_L, V_L, U_R, and V_R. The control circuit 300 controls the switching operations of the FETs in the bridge circuits L and R by PWM control such that currents flowing through the phases have values shown in Table 4.

In the event of a short-circuit failure in the FET 143H, a voltage is applied to the winding M3. However, all the other FETs 113H, 113L, and 143L of the same W-phase are off, and therefore, a current does not flow through the winding M3. Therefore, the two-phase conduction control can be performed.

In the event of a failure in any of the other FETs 113H, 113H, and 143L different from the FET 14311 in the H-bridge 133, the two-phase conduction control can be performed as in the above case.

Thus, when a failure has been detected in a FET included in the first inverter 110 or the second inverter 140, the control of the first inverter 110 and the second inverter 140 is changed from the three-phase conduction control to the two-phase conduction control. As a result, even in the event of a failure in a FET included in the first inverter 110 or the second inverter 140, the motor 200 can continue to be driven to rotate.

In the embodiment described above, a three-phase motor has been illustrated as the motor 200. Alternatively, the motor 200 may be a motor having more than three phases. The motor 200 may be an n-phase motor having n phase windings (n is an integer of three or more), such as a four-phase motor, five-phase motor, or six-phase motor. As an example, an embodiment in which the motor 200 is a five-phase motor will now be described.

Figure 17:
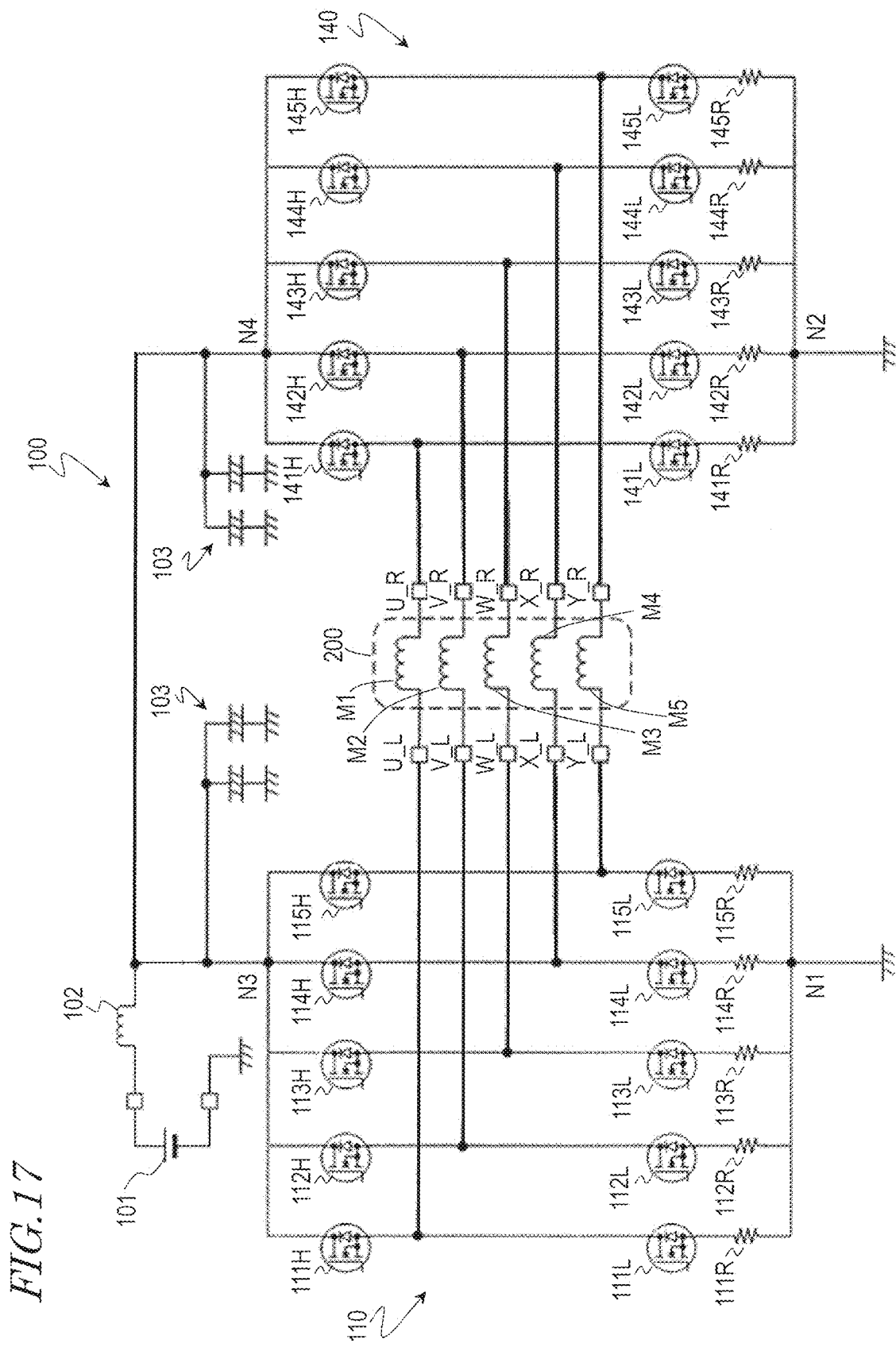
FIG. 17 is a circuit diagram showing still another circuit configuration of a power conversion device according to an illustrative embodiment.

FIG. 17 schematically shows a circuit configuration of a power conversion device 100 according to this embodiment. In the example of FIG. 17, a motor 200 is a five-phase motor. The motor 200 includes a U-phase winding M1, a V-phase winding M2, a W-phase winding M3, an X-phase winding M4, and a Y-phase winding M5.

Compared to the power conversion device 100 of FIG. 1, in the example of FIG. 17 a first inverter 110 further includes terminals X_L and Y_L corresponding to the X-phase and the Y-phase, and a second inverter 140 further includes terminals X_R and Y_R corresponding to the X-phase and the Y-phase. The terminal X_L of the first inverter 110 is coupled to one end of the X-phase winding M4, and the terminal Y_L is coupled to one end of the Y-phase winding M5. The terminal X_R of the second inverter 140 is coupled to the other end of the X-phase winding M4, and the terminal Y_R is coupled to the other end of the Y-phase winding M5.

Referring to FIG. 17, the first inverter 110 further includes FETs 114H, 114L, 115H, and 115L. The second inverter 140 further includes FETs 144H, 144L, 145H, and 145L. The first inverter 110 further includes shunt resistors 114R and 115R. The second inverter 140 further includes shunt resistors 144R and 145R. The first inverter 110 and the second inverter 140 each include five legs each including a low-side switching element and a high-side switching element. The switching elements included in the legs of the first inverter 110 and the second inverter 140, and the windings of the electric motor 200, form five H-bridges.

Figure 18:
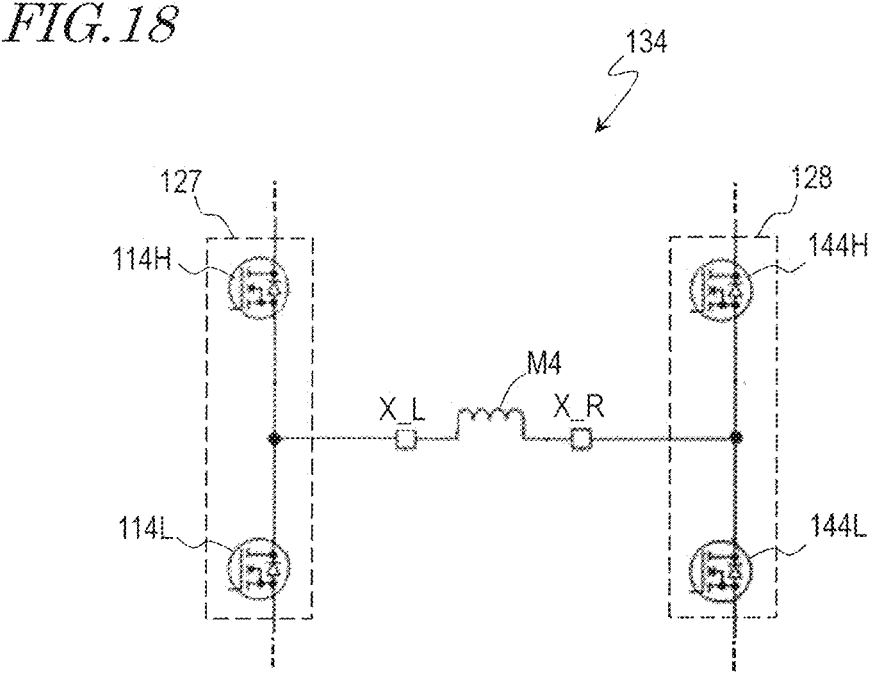
FIG. 18 is a diagram showing an H-bridge included in a power conversion device according to an illustrative embodiment.
Figure 19:
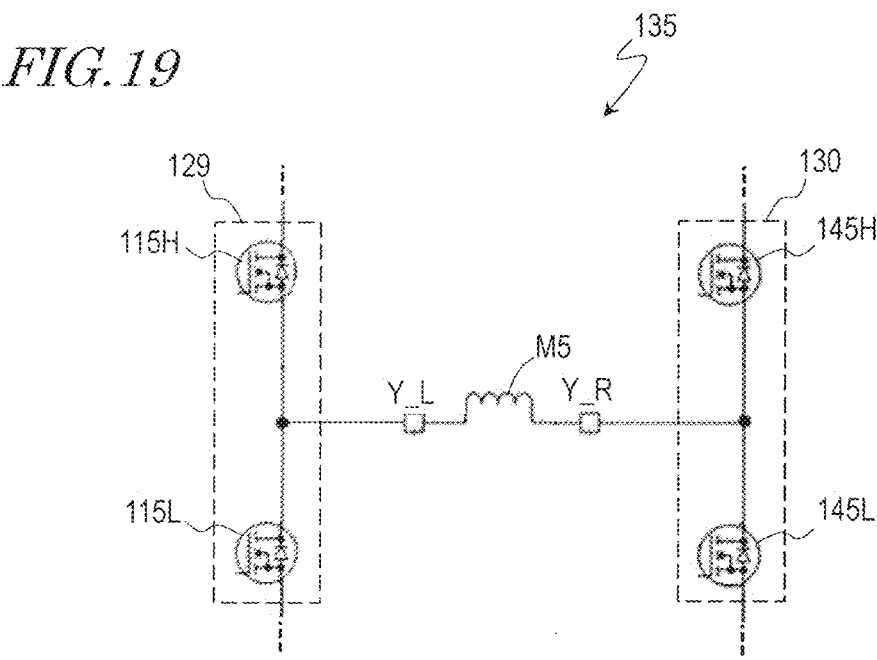
FIG. 19 is a diagram showing an H-bridge included in a power conversion device according to an illustrative embodiment.

FIGS. 18 and 19 are diagrams showing H-bridges 134 and 135 included in the power conversion device 100 of FIG. 17. The first inverter 110 includes legs 127 and 129. The leg 127 has the FET 114H and the FET 114L. The leg 129 has the FET 115H and the FET 115L. The second inverter 140 has legs 128 and 130. The leg 128 has the FET 144H and the FET 144L. The leg 130 has the FET 145H and the FET 145L. The H-bridge 134 of FIG. 18 has the leg 127, the winding M4, and the leg 128. The H-bridge 135 of FIG. 19 has the leg 129, the winding M5, and the leg 130.

In the example of FIG. 17, a shunt resistor is provided in each leg of each inverter. The shunt resistors may be arranged in a manner similar to that shown in FIG. 5, i.e., five shunt resistors may be provided between the legs of one of the first and second inverters 110 and 140, and the windings M1, M2, M3, M4, and M5. Alternatively, as in the example of FIG. 6, a single shunt resistor may be provided in each inverter and shared by the phase windings.

In the power conversion device 100 under normal conditions, the control circuit 300 (FIG. 7) performs five-phase conduction control using both the first and second inverters 110 and 140 to drive the motor 200. As in the control of the power conversion device 100 of FIG. 1, the control circuit 300 performs the five-phase conduction control by performing switching control on the FETs of the first inverter 110 and the FETs of the second inverter 140 using opposite phases (phase difference=180°). For example, in the case of the H-bridge 134 (FIG. 18) including the FETs 114H 114L, 144H, and 144L, when the FET 114L is turned on, the FET 144L is turned off, and when the FET 114L is turned off, the FET 144L is turned on. Similarly, when the FET 114H is turned on, the FET 144H is turned off, and when the FET 114H is turned off, the FET 144H is turned on. In the five-phase conduction control under normal conditions, the waveform of a current flowing through each of the U-phase, V-phase, W-phase, X-phase, and Y-phase windings is a sine wave that is different from that of an adjacent one in phase by 72°.

Figure 20:
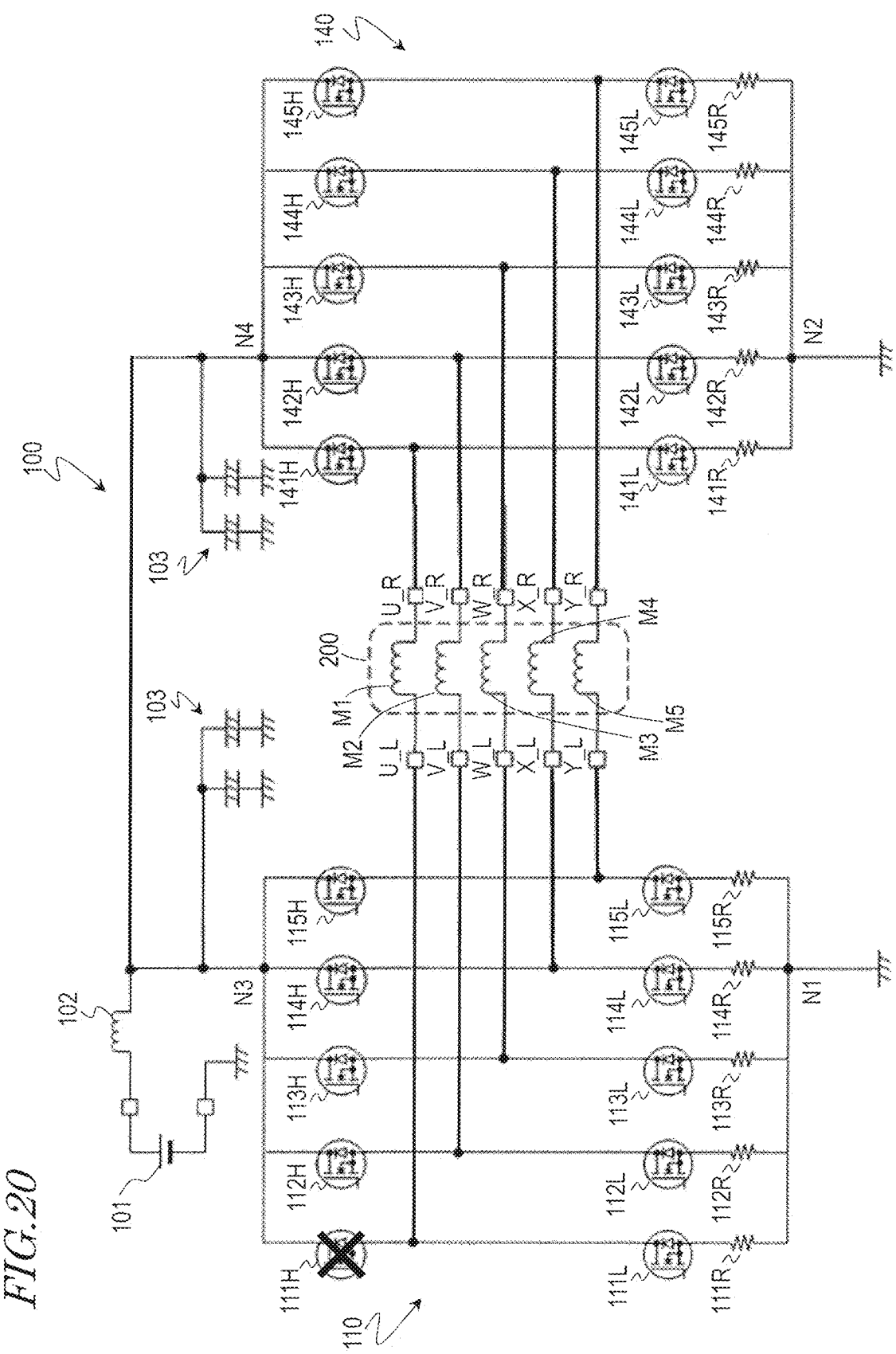
FIG. 20 is a schematic diagram showing a power conversion device according to an illustrative embodiment under abnormal conditions.

Next, a method for controlling the power conversion device 100 under abnormal conditions will be described. FIG. 20 is a diagram showing a situation that a U-phase FET has failed in the power conversion device 100.

When the drive circuit 350 (FIG. 7) has detected a failure in a FET, the control circuit 300 changes the control of the first inverter 110 and the second inverter 140 from the five-phase conduction control to four-phase conduction control. In this case, the four-phase conduction control is performed using the other four phases different from one of the five phases that corresponds to a winding coupled to the failed FET.

For example, as shown in FIG. 20, it is assumed that the FET 111H of the first inverter 110 has failed. In this example, it is assumed that an open-circuit failure has occurred in the FET 111H. In this case, the control circuit 300 turns off the other FET 111L of the leg 121 (FIG. 2) including the failed FET 111H. In addition, the control circuit 300 turns off all the FETs 141H and 141L of the leg 122 of the second inverter 140 which is included in the H-bridge 131 formed by the failed leg 121 and the leg 122.

The control circuit 300 performs the four-phase conduction control using the other eight legs 123, 124, 125, 126, 127, 128, 129, and 130 (FIGS. 3, 4, 18, and 19) different from the failed leg 121 including the failed FET 111H and the leg 122 included in the H-bridge 131 formed by the failed leg 121 and the leg 122. In other words, the control circuit 300 performs the four-phase conduction control using the other four H-bridges 132, 133, 134, and 135 (V-phase, W-phase, X-phase, and Y-phase) different from the H-bridge 131 (U-phase) including the failed FET 111H.

In the event of a short-circuit failure in the FET 111H, a voltage is applied through the FET 111H to the winding M1. However, all the other FETs 111L, 141H, and 141L of the same U-phase are off, and therefore, a current does not flow through the winding M1. Therefore, the four-phase conduction control can be performed.

In the event of a failure in any of the other FETs 111L, 141H, and 141L different from the FET 111H in the H-bridge 131, the four-phase conduction control can be performed using the H-bridges other than the H-bridge 131 as in the above case. In addition, in the event of a failure in any of the FETs included in the other H-bridges 132, 133, 134, and 135 different from the H-bridge 131, the four-phase conduction control can be performed using the other H-bridges different from the failed H-bridge as in the above case.

Thus, when a failure has been detected in a FET included in the first inverter 110 or the second inverter 140, the control of the first inverter 110 and the second inverter 140 is changed from the five-phase conduction control to the four-phase conduction control. As a result, even in the event of a failure in a FET included in the first inverter 110 or the second inverter 140, the motor 200 can continue to be driven to rotate.

In the foregoing, when a failure has been detected in a FET, the five-phase conduction control is replaced by the four-phase conduction control. The number of phases that are driven in the event of a failure is not limited to the number of phases that is one less than under normal conditions. When a failure has been detected in a FET, the five-phase conduction control may be replaced by the two-phase conduction control or three-phase conduction control. For example, when a FET included in the H-bridge 131 (U-phase) has failed, two or three H-bridges may be selected from the other H-bridges 132, 133, 134, and 135 (V-phase, W-phase, X-phase, and Y-phase), and the two-phase conduction control or three-phase conduction control may be performed using the selected H-bridges. In this case, all FETs included in the non-selected ones of the H-bridges 132, 133, 134, and 135 are turned off.

For example, in the event of a failure in the FET 111H, all the FETs 111L, 141H, and 141L other than the FET 111H of the H-bridge 131 may be turned off. In addition, all the FETs of the H-bridges 133 and 135 may be turned off. The two-phase conduction control may be performed using the FETs of the remaining H-bridges 132 and 134.

Alternatively, for example, in the event of a failure in the FET 111H, all the FETs 111L, 141H, and 141L other than the FET 111H of the H-bridge 131 are turned off. In addition, all the FETs of the H-bridge 133 may be turned off. The two-phase conduction control may be performed using the FETs of the remaining H-bridges 132, 134, and 135.

Similarly, in the case where the motor 200 is a four-phase motor, when a failure has been detected in a FET, the four-phase conduction control may be replaced by the three-phase conduction control or two-phase conduction control.

Similarly, in the case where the motor 200 is a six-phase motor, when a failure has been detected in a FET, the six-phase conduction control may be replaced by any of the five-phase conduction control, four-phase conduction control, three-phase conduction control, and two-phase conduction control.

Thus, when a failure has been detected in a FET, n-phase conduction control is replaced by m-phase conduction control. Here, n is an integer of three or more, and m is an integer of not smaller than two and smaller than n. When a failure has been detected in a FET, the motor 200 may be driven to rotate using a minimum number of phases that allows the motor 200 to be driven to rotate. For example, a brushless motor can be driven using two or more phases. By suitably setting the number of phases that are used in the event of a failure, an optimum motor output can be selected, and an additional failure can be prevented or reduced in the motor 200.

Second Embodiment

Vehicles such as automobiles are typically equipped with an electric power steering device. The electric power steering device generates an assistive torque that is added to the steering torque of a steering system that is generated by a driver turning a steering wheel. The assistive torque is generated by an assistive torque mechanism, and can reduce a driver's burden of turning a steering wheel. For example, the assistive torque mechanism includes a steering torque sensor, an ECU, a motor, and a deceleration mechanism, etc. The steering torque sensor detects a steering torque in the steering system. The ECU generates a drive signal on the basis of a detection signal from the steering torque sensor. The motor generates an assistive torque depending on the steering torque on the basis of the motor drive signal. The assistive torque is transferred through the deceleration mechanism to the steering system.

Figure 21:
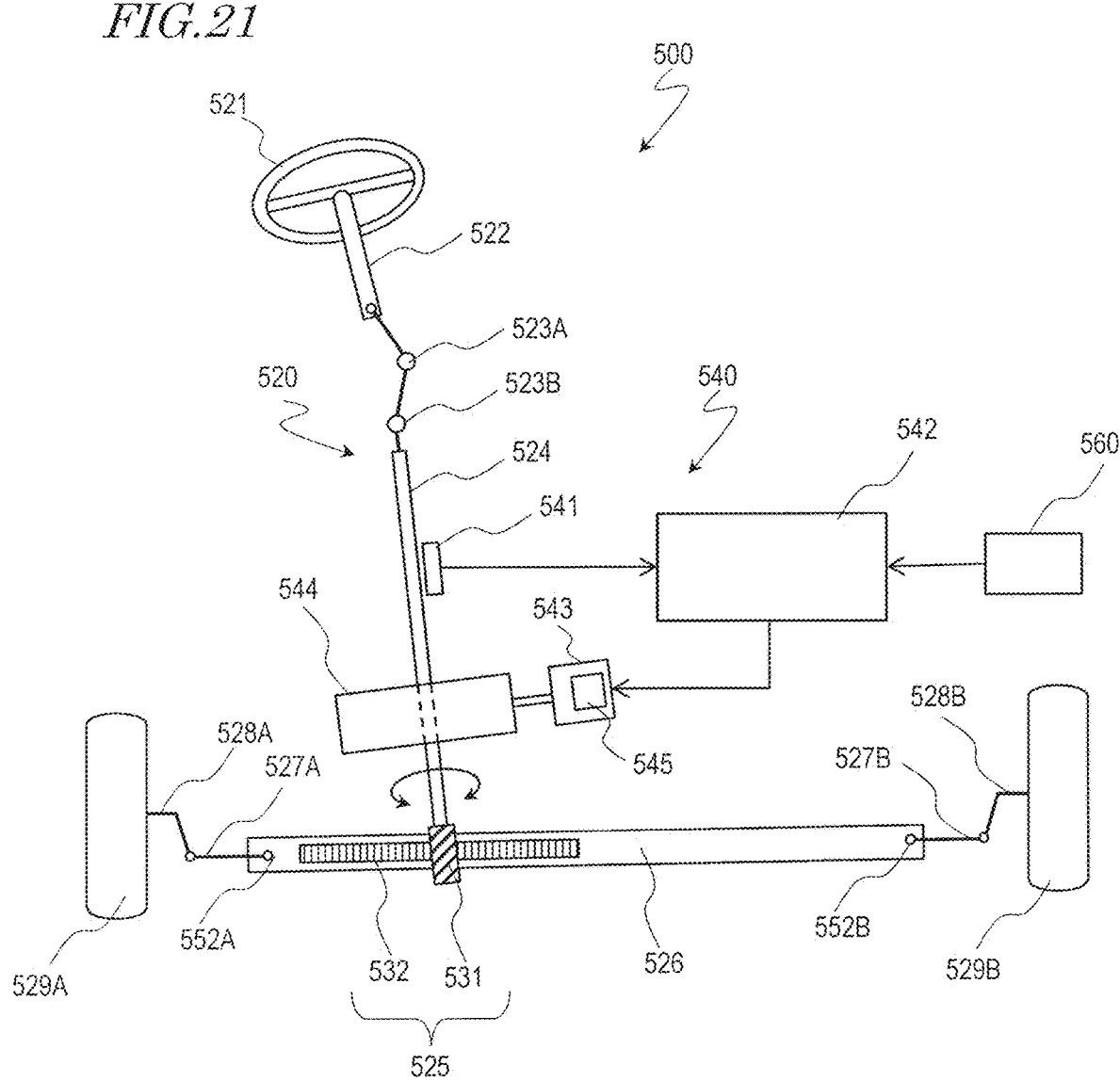
FIG. 21 is a schematic diagram showing a configuration of an electric power steering device according to an illustrative embodiment.

The motor drive unit 400 of the present disclosure may be used in the electric power steering device. FIG. 21 schematically shows a configuration of an electric power steering device 500 according to this embodiment. The electric power steering device 500 includes a steering system 520 and an assistive torque mechanism 540.

The steering system 520 includes, for example, a steering wheel 521, a steering shaft 522 (also called a "steering column"), universal couplings 523A and 523B, a rotating shaft 524 (also called a "pinion shaft" or "input shaft"), a rack and pinion mechanism 525, a rack shaft 526, left and right ball joints 552A and 552B, tie rods 527A and 527B, knuckles 528A and 528B, and left and right steerable wheels (e.g., left and right front wheels) 529A and 529B. The steering wheel 521 is linked through the steering shaft 522 and the universal couplings 523A and 523B to the rotating shaft 524. The rotating shaft 524 is linked through the rack and pinion mechanism 525 to the rack shaft 526. The rack and pinion mechanism 525 has a pinion 531 provided on the rotating shaft 524, and a rack 532 provided on the rack shaft 526. A right end of the rack shaft 526 is linked to the right steerable wheel 529A through the ball joint 552A, the tie rod 527A, and the knuckle 528A in this order with the ball joint 552A being closest to the right end of the rack shaft 526. As with the right side, a left end of the rack shaft 526 is linked to the left steerable wheel 529B through the ball joint 552B, the tie rod 527B, and the knuckle 528B in this order with the ball joint 552B being closest to the left end of the rack shaft 526. Here, the right and left sides correspond to the right and left sides, respectively, of a driver sitting on a seat.

In the steering system 520, a steering torque is generated by a driver turning the steering wheel 521, and is transmitted through the rack and pinion mechanism 525 to the left and right steerable wheels 529A and 529B. As a result, the driver can control the left and right steerable wheels 529A and 529B.

The assistive torque mechanism 540 includes, for example, a steering torque sensor 541, an ECU 542, a motor 543, a deceleration mechanism 544, and a power conversion device 545. The assistive torque mechanism 540 applies an assistive torque to the steering system 520 including from the steering wheel 521 to the left and right steerable wheels 529A and 529B. Note that the assistive torque may also be called an "additional torque."

As the ECU 542, the control circuit 300 of the embodiment can be used. As the power conversion device 545, the power conversion device 100 of the embodiment can be used. The motor 543 is equivalent to the motor 200 of the embodiment. As a mechanically and electronically integrated unit including the ECU 542, the motor 543, and the power conversion device 545, the motor drive unit 400 of the embodiment may be used.

The steering torque sensor 541 detects a steering torque that is applied to the steering system 520 using the steering wheel 521. The ECU 542 generates a drive signal for driving the motor 543 on the basis of a detection signal (hereinafter referred to as a "torque signal") from the steering torque sensor 541. The motor 543 generates an assistive torque depending on the steering torque on the basis of the drive signal. The assistive torque is transmitted through the deceleration mechanism 544 to the rotating shaft 524 of the steering system 520. The deceleration mechanism 544 is, for example, a worm gear mechanism. The assistive torque is further transmitted from the rotating shaft 524 to the rack and pinion mechanism 525.

The electric power steering device 500 may be categorized into the pinion assist type, rack assist type, column assist type, etc., according to a portion of the steering system 520 to which the assistive torque is added. FIG. 21 illustrates the electric power steering device 500 of the pinion assist type. Note that the electric power steering device 500 may be of the rack assist type, column assist type, etc.

In addition to the torque signal, a vehicle speed signal may be input to the ECU 542, for example. A piece of external equipment 560 may, for example, be a vehicle speed sensor. Alternatively, the external equipment 560 may, for example, be another ECU that can communicate with the ECU 542 over an in-vehicle network, such as a controller area network (CAN). The microcontroller of the ECU 542 can perform vector control or PWM control on the motor 543 on the basis of the torque signal and the vehicle speed signal, etc.

The ECU 542 determines a desired current value on the basis of at least the torque signal. The ECU 542 may determine the desired current value, taking into account the vehicle speed signal detected by the vehicle speed sensor, and in addition, a rotor rotation signal detected by an angle sensor 320. The ECU 542 can control a drive signal, i.e. a drive current, for the motor 543 such that an actual current value detected by a current sensor 170 is equal to the desired current value.

The electric power steering device 500 can control the left and right steerable wheels 529A and 529B through the rack shaft 526 using a composite torque obtained by adding the assistive torque of the motor 543 to a driver's steering torque. In particular, if the motor drive unit 400 of the present disclosure is applied to the above mechanically and electronically integrated unit, an electric power steering device including a motor drive unit is provided in which the quality of parts can be improved, and suitable current control can be performed under both normal and abnormal conditions.

In the foregoing, embodiments of the present disclosure have been described. The above embodiments are merely illustrative and are not intended to limit the technology of the present disclosure. The components of the above embodiments can be otherwise combined as appropriate.

INDUSTRIAL APPLICABILITY

The embodiments of the present disclosure are applicable to a wide variety of devices including various motors, such as vacuum cleaners, dryers, ceiling fans, washing machines, refrigerators, and electric power steering devices.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A power conversion device for converting power that is to be supplied to an electric motor having n phase windings, n is an integer of three or more, the device comprising:
    a first inverter to which a first end of each phase winding of the electric motor is coupled;
    a second inverter to which a second end of each phase winding is coupled;
    a plurality of switching elements provided in the first and second inverters;
    a control circuit structured to perform n-phase conduction control on the first and second inverters; and
    a detection circuit structured to detect a failure in the plurality of switching elements,
    wherein the control circuit is structured such that, when the detection circuit has detected the failure in any of the plurality of switching elements, the control circuit changes the n-phase conduction control of the first and second inverters to m-phase conduction control using m phases of the n phases different from the phase of a winding coupled to the failed switching element, m being an integer not smaller than two and smaller than n,
    the first and second inverters each comprise n legs each having a low-side switching element and a high-side switching element, and
    the control circuit is structured such that, when the failed switching element is included in the first inverter, the control circuit performs the m-phase conduction control using 2m legs different from a failed leg including the failed switching element and a leg of the second inverter included in an H-bridge formed by the failed leg and the leg of the second inverter.

2. The power conversion device of claim 1, wherein the plurality of switching elements of the first and second inverters form a plurality of H-bridges.

3. The power conversion device of claim 1, wherein the control circuit is structured such that, when the failed switching element is included in the first inverter, the control circuit performs the m-phase conduction control with the switching elements other than the failed switching element of a failed leg being off, and all the switching elements of a leg of the second inverter in an H-bridge formed by the failed leg and the leg of the second inverter being off.

4. The power conversion device of claim 1, further comprising:
    2n or less shunt resistors.

5. The power conversion device of claim 1, further comprising:
    2n or less shunt resistors,
    wherein the 2n or less shunt resistors are coupled between 2n or less low-side switching elements of the 2n legs of the first and second inverters, and a ground.

6. The power conversion device of claim 1, further comprising:
    a shunt resistor coupled between the first inverter and a ground, and a shunt resistor coupled between the second inverter and a ground.

7. The power conversion device of claim 1, wherein the plurality of switching elements each comprise a transistor having a gate electrode, a source electrode, and a drain electrode, and
    the detection circuit compares a drain-source voltage of the transistor with a threshold voltage to detect a failure in the transistor.

8. The power conversion device of claim 1, wherein the electric motor comprises three phase windings,
    the control circuit is structured such that, when the detection circuit has detected the failure in any of the plurality of switching elements, the control circuit changes the control of the first and second inverters from three-phase conduction control to two-phase conduction control.

9. A motor drive unit comprising:
    the power conversion device of claim 1; and
    the electric motor.

10. An electric power steering device comprising:
    the motor drive unit of claim 9.

* * * * *